United States Patent
Shattil

(10) Patent No.: US 7,477,921 B2
(45) Date of Patent: *Jan. 13, 2009

(54) CANCELLATION SYSTEM FOR FREQUENCY REUSE IN MICROWAVE COMMUNICATIONS

(75) Inventor: Steve J. Shattil, Boulder, CO (US)

(73) Assignee: Lot 42 Acquisition Foundation, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,240

(22) Filed: Oct. 15, 2007

(65) Prior Publication Data

US 2008/0039147 A1 Feb. 14, 2008

Related U.S. Application Data

(60) Continuation of application No. 11/102,088, filed on Apr. 7, 2005, now Pat. No. 7,283,799, which is a division of application No. 09/472,300, filed on Dec. 27, 1999, now Pat. No. 6,882,868, which is a division of application No. 08/862,859, filed on May 23, 1997, now Pat. No. 6,008,760.

(51) Int. Cl.
*H04M 1/00* (2006.01)

(52) U.S. Cl. ............... 455/562.1; 455/447; 455/276.1; 455/279.1; 455/63.4; 455/67.11; 342/378; 342/361; 375/246

(58) Field of Classification Search ............... 455/447, 455/276.1, 279.1, 63.4, 67.11, 501, 101, 455/522, 562.1, 296; 342/378, 361; 375/246
See application file for complete search history.

(56) References Cited

U.S. PATENT DOCUMENTS

| | | | |
|---|---|---|---|
| 3,766,559 A | 10/1973 | Butcher, Jr. et al. | |
| 3,860,343 A | 1/1975 | Janney et al. | |
| 3,963,990 A | 6/1976 | DiFonzo | |
| 4,313,225 A | 1/1982 | Carbrey et al. | |

(Continued)

FOREIGN PATENT DOCUMENTS

WO 95/03686 A1 2/1995

OTHER PUBLICATIONS

Xu, Guanghan and Li, San-qi, "Throughput Multiplication of Wireless LANs for Multimedia Services: SDMA Protocol Design," Communications: The Global Bridge, IEEE, vol. 3, 1994, pp. 1326-1332.

*Primary Examiner*—Sanh D Phu
(74) *Attorney, Agent, or Firm*—Connolly Bove Lodge & Hutz LLP

(57) ABSTRACT

Substantial improvements in frequency reuse in microwave communications systems is achieved by canceling co-channel interference and transmitter leakage. Interferometric beam-narrowing reduces beamwidth without reducing peak magnitude of the beam pattern. Frequency-dependent beam-shaping compensates for frequency-dependent distortions of the beam pattern thereby improving bandwidth. A spatial demultiplexing technique utilizes spatial gain distributions of received signals to separate signals, even from co-located transmit sources, and uses microwave lensing to enhance received spatial gain distributions. Predetermined cross-polarization interference is used to separate differently-polarized receive signals. A reference branch provides a cancellation signal to a receiver to cancel transmitter leakage signals. An error signal controls an impedance-compensation circuit that is responsive to changes in antenna impedance but not to receive signals. A dc bias magnetic field applied to a magnetic permeable material adjusts non-linear distortion in a cancellation circuit for canceling distortion in a transmitter leakage signal. Discreet impedance elements approximate a circuit having distributed impedance.

17 Claims, 9 Drawing Sheets

U.S. PATENT DOCUMENTS

| | | |
|---|---|---|
| 4,561,114 A | 12/1985 | Kozono et al. |
| 4,970,519 A | 11/1990 | Minnis et al. |
| 5,105,435 A | 4/1992 | Stilwell |
| 5,132,694 A | 7/1992 | Sreenivas |
| 5,373,301 A | 12/1994 | Bowers et al. |
| 5,432,522 A | 7/1995 | Kurokami et al. |
| 5,471,647 A | 11/1995 | Gerlach et al. |
| 5,515,378 A | 5/1996 | Roy, III et al. |
| 5,523,526 A | 6/1996 | Shattil |
| 5,533,055 A | 7/1996 | Matzek |
| 5,592,490 A | 1/1997 | Barratt et al. |
| 5,594,946 A | 1/1997 | Menich et al. |
| 5,603,087 A | 2/1997 | Shultz |
| 5,634,199 A | 5/1997 | Gerlach et al. |
| 5,898,740 A | 4/1999 | Laakso et al. |
| 5,966,403 A * | 10/1999 | Pon .................. 375/148 |
| 6,006,117 A | 12/1999 | Hageltorn et al. |
| 6,008,760 A | 12/1999 | Shattil |
| 6,018,317 A | 1/2000 | Dogan et al. |
| 6,208,135 B1 | 3/2001 | Shattil |
| 6,882,868 B1 | 4/2005 | Shattil |

\* cited by examiner

CANCELLATION SYSTEM FOR FREQUENCY REUSE IN MICROWAVE COMMUNICATIONS

RELATED APPLICATIONS

This application is a Continuation of U.S. patent application Ser. No. 11/102,088, filed Apr. 7, 2005, which is a Divisional of U.S. patent application Ser. No. 09/472,300, filed Dec. 27, 1999, now U.S. Pat. No. 6,882,868), which is a Divisional of U.S. application Ser. No. 08/862,859, filed May 23, 1997, now U.S. Pat. No. 6,008,760.

BACKGROUND OF THE INVENTION

The present invention relates generally to free-space radio frequency (RF) communication systems and, more particularly, to isolation systems that separate the receive signal from interfering signals in a RF communications system. Interfering signals include signals received by the communications antenna causing co-channel interference and transmit signal leakage of the antenna's transmitter signal into the receiver. Many electronic systems, such as radar and wireless communication systems, operate over a wide range of microwave frequencies. For example, many radar and communication systems operate in what is known as a frequency-hopping or a frequency-agile manner over very wide microwave bandwidths. The bandwidth can vary up to an octave or more, and the frequencies can range from the S to Ku bands. The main objectives of an isolation system used in a full-duplex communication system is to provide low transmitter-loss and a high degree of isolation over a wide dynamic range of frequencies.

Non-reciprocal devices, such as circulators, are commonly used to provide isolation between a transmitter and receiver in a microwave antenna system. However, the degree of isolation is severely limited by the operating frequency range, and a circulator's isolation and transmission deteriorate as the input ports become unmatched. Direct leakage between the transmitter and receiver is usually the primary cause of interference, particularly in systems that do not employ circulators. U.S. Pat. No. 5,373,301 discloses a means for canceling direct leakage in an antenna system that has simple resistive three-port junctions which use a signal derived from a dummy circuit receiving a large portion of the transmit signal. However, this design requires at least half of the signal power produced by the transmitter to be used to cancel the interference.

Environmental effects, such as temperature changes and aging, cause an antenna's impedance to change, resulting in changes in the impedance-matching within the antenna circuit and unbalancing of any cancellation signal synthesized and applied to the receiver for canceling transmit interference. U.S. Pat. No. 4,970,519 shows a circuit that adjusts the amplitude and phase of a cancellation signal in order to optimize cancellation of transmit interference at a receiver. Signal phase-adjustment is performed by adjustment of delay lines in order to equalize the propagation paths of the cancellation signal and leakage signal. The signal level at the receiver is used as an error signal and fed back in a "control loop" for adjusting the amplitude and phase of the cancellation signal on the basis of minimizing the error signal. As a result, the receive signal corrupts the error signal and cannot be entirely removed by cancellation or correlation using the transmit signal. In addition, the cancellation must have frequency-dependent amplitude and phase characteristics that closely match those characteristics of the transmit signal in order to attain effective cancellation over a broad spectrum of transmit frequencies. Because interference occurs until the cancellation signal's parameters are optimized, continual adjustment of the cancellation signal will cause an interference signal whose magnitude depends on the response-rate of the signal-optimization process. Finally, intermodulation and distortion products are produced by the non-linear response of ferrite materials, which are commonly used as part of the antenna structure or circulator. Such interference is commonly removed by filtering, which has the undesirable consequence of limiting the effective bandwidth of operation of the antenna.

Some techniques for reducing co-channel interference include frequency-separation, time-division, orthogonal polarization, and spatial separation. Further reduction of interference requires some type of cancellation. U.S. Pat. No. 5,432,522 shows a canceller that reduces cross-polarization interference in two orthogonally polarized channels. U.S. Pat. No. 5,515,378 applies adaptive phased-array technology to wireless communications in order to provide spatial multiplexing and demultiplexing of communications channels. This prior-art adaptive processing in an antenna array is essentially a cancellation process. Each element of the array has an associated electrical signal that is adjusted by a complex-valued weight, then summed to provide an antenna beam pattern having nulls (canceled responses) in a predetermined direction. Problems with this technique include the inability to resolve co-located or closely-spaced radio sources and increased side-lobe structures relative to main-beam magnitude that results when the width of the main beam is narrowed. If wide-band or multiple frequencies are transmitted, this causes distortion of the main beam and variance in the location of the nulls.

SUMMARY OF THE INVENTION

The present invention addresses the lack of available frequency bandwidth allocation for wireless RF communications. Effects of these problems include limited data transmission capacity, co-channel interference, and limited access to wireless services resulting from increased demand for those services. Substantial improvements in frequency reuse are implemented through innovations in spatial multiplexing and isolation technologies disclosed herein. Applications of these new techniques are directed toward, but not limited to, stationary line-of-sight microwave communications systems. One embodiment of the present invention is a microwave antenna array that receives a plurality of signals having a common frequency channel that is transmitted from a remote location. This antenna array is able to resolve signals from even co-located sources and consequently provides a frequency reuse improvement of at least several orders of magnitude over the prior art.

Accordingly, it is a first object of the invention to utilize a new type of spatial demultiplexing technique that makes use of spatial gain distribution characteristics of received signals to resolve closely-spaced and co-located sources. The spatial gain distribution of each receive signal has known characteristics that provide ratios of co-channel interference terms at the antenna elements. These ratios are used to weight a cancellation circuit, which separates the received signals. Shaping of the spatial gain distributions may be accomplished using a microwave lens at either or both the transmit antenna or the receive antenna. Adjustment of the spatial gain distribution may be accomplished by aperture synthesis, beam-steering or interferometric combining of a plurality of beam patterns. Another application of the demultiplexing technique includes separating polarized receive signals having known cross-polarization terms.

Another object of the present invention is to provide an interferometric beam-shaping means whereby multiple antenna beam patterns are combined to provide cancellation in predetermined directions without reducing the magnitude of the main beam. A beam-shaping circuit provides frequency-dependent weights to the electrical signals that create the beam pattern. This is done to preserve the shape of the beam pattern for broad-frequency band transmission and reception, and is applied to each component beam pattern of the interferometric beam pattern.

Therefore it is another object of the present invention to provide a frequency-dependent beam-shaping means to compensate for frequency-dependent distortions in the main beam and variance in the locations of the nulls.

A wireless communications environment imposes a number of constraints and performance limitations on an adaptive cancellation system used to cancel transmitter interference at the receiver. Therefore, it is an object of the present invention to provide an adaptive canceller that utilizes an error signal free from receiver signals. Thus the adaptive canceller is made more suitable for optimizing the amplitude and phase of a cancellation signal.

It is another object of the present invention to utilize a distributed impedance circuit as a dummy circuit in order to approximate the distributed impedance of an antenna for attaining broad-band cancellation of transmit signals in the receiver.

Another object of the present invention is to model the distributed impedance of an antenna using finite elements in a dummy circuit for attaining broad-band cancellation of transmit signals in the receiver.

It is another object of the present invention to cancel transmit leakage signals resulting from impedance-differences between the antenna and the compensating dummy circuit without canceling the receive signal.

It is still another object of the present invention to cancel harmonic and intermodulation distortion signals resulting from the non-linear response of ferrite materials to the transmit signal, thereby providing the antenna system with broad-band capabilities.

It is a final object of the present invention to provide a dummy circuit in a transmit signal cancellation network for canceling direct leakage from the transmitter that provides better than fifty percent transmit efficiency to the antenna.

DETAILED DESCRIPTION OF PREFERRED EMBODIMENTS

Figure 1:
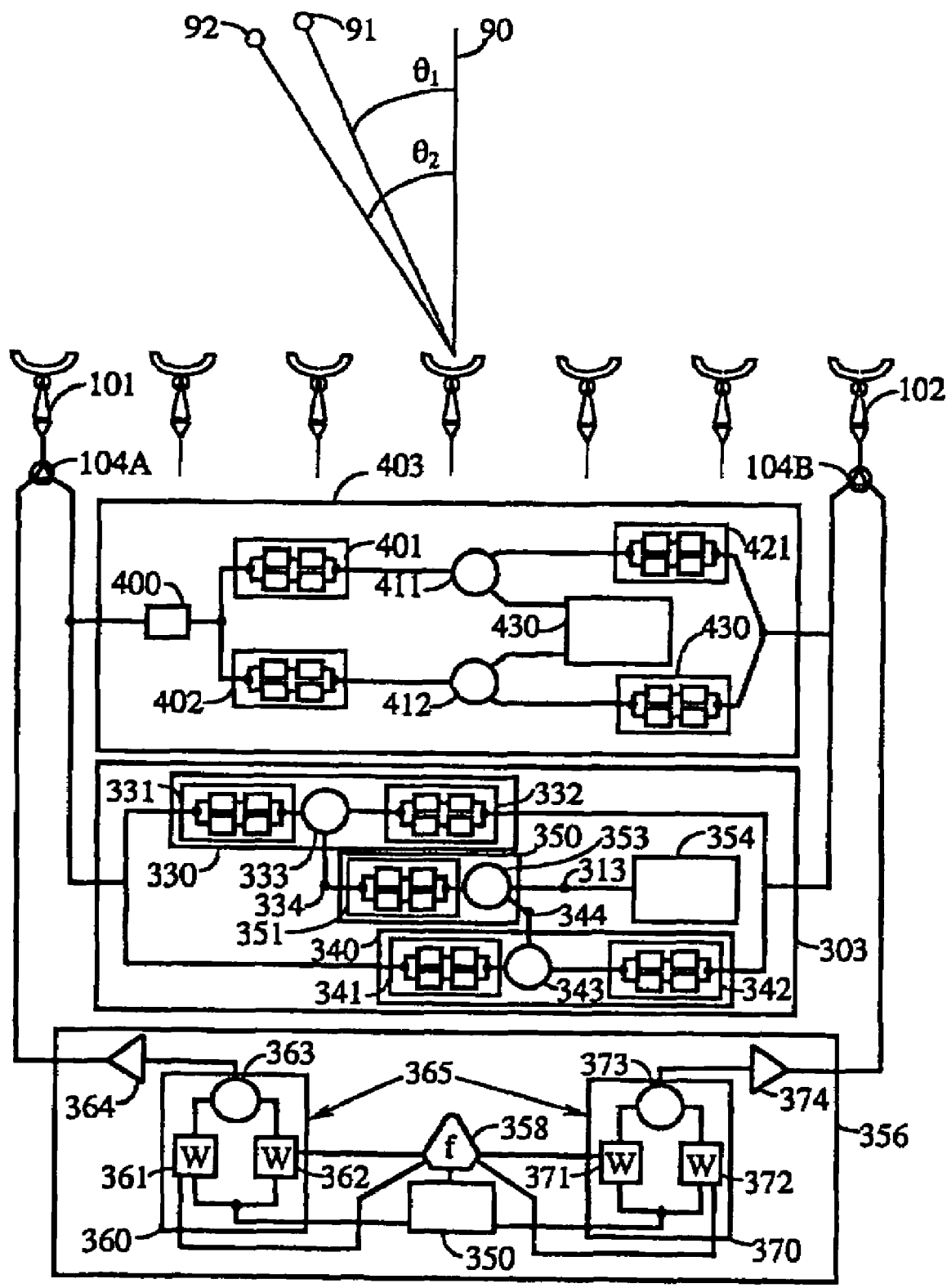
FIG. 1 is an embodiment of an antenna array of the present invention.

FIG. 1 shows part of an antenna array 100 of the present invention comprising a first antenna 101 and a second antenna 102 coupled to an interferometric beams-narrowing processor 303. The first antenna 101 is coupled to the processor 303 by a first three-port device 104A, and the second antenna 102 is coupled to the processor 303 by a second three-port device 104B. The processor 303 has a receiver output 313. Although only two elements 101 and 102 are shown in this array 100, the principles regarding the operation of this antenna array 100 may be extended to more than two antennas.

A first distant radio-frequency source 91 is spatially separated from a second distant radio-frequency source 92. In this case, both sources 91 and 92 radiate at a common wavelength $\lambda$; however, these sources may radiate at different wavelengths. Radiation from the first source 91 is shown as a plane wave 119 representing a common phase-front incident at the antennas 101 and 102 at a first incidence angle $\theta_1$ relative to normal incidence 90. A plane wave 129 represents a common phase-front of radiation from the second source 92 impinging on the antenna elements 101 and 102 at a second incidence angle $\theta_2$ relative to normal incidence 90.

Radiation 119 received by antenna 101 induces a first electrical receive signal $S_{11}=S_1 \text{Sin}(\omega t+\phi_1)$ that is coupled to a first weight-and-sum processor 330, where $\omega=2\pi c/\lambda$, c is the speed of light constant, $S_1$ is the magnitude of the induced signal $S_{11}$, t is time, and $\phi_1$ is an arbitrary phase constant. A first electrical receive signal $S_{21}=S_1 \text{Sin}(\omega t+\phi_1+D_1)$ at the second antenna 102, which is induced by radiation 119, is coupled to the first processor 330. $D_1$ is delay in radians: $D_1=2\pi(d \text{ Sin } \theta_1)/\lambda$ where d is the separation between the antennas 101 and 102. The first processor 330 includes a first weighting element 331 which applies a complex weight $W_1$ to signal $S_{11}$, delaying signal $S_{11}$ by an amount equal to the delay $D_1$. The first processor 330 also includes a first combining circuit 333 to sum electrical signals from the antennas 101 and 102 and output the summed signals at a first output port 334. In this case, the weighting element 331 provides unity gain in accordance with the assumptions of substantially identical antenna responses of both antennas 101 and 102 to radiation 119 and substantially uniform intensity of the radiation 119 (minimal spatial gain variance) at both of the antenna 101 and 102 locations. The first processor 330 may also include a second weighting element 332 coupled between the second antenna 102 and the combining circuit 333. For the purpose of this discussion, the second weighting element 332 does not provide delay or gain adjustment. The signals $S_{11}$ and $S_{12}$ are combined in-phase to provide totally constructive interference.

Radiation 129 received at the first antenna 101 induces a second electrical receive signal at the antenna 101: $S_{12}=S_2 \sin(\omega t+\phi_2)$, where $S_2$ is the magnitude of the induced signal $S_{12}$. Radiation 129 received at the second antenna 102 induces a second receive signal at the antenna 102: $S_{22}=S_2 \sin(\omega t+\phi_2+D_2)$, where $D_2$ is delay in radians: $D_2=2\pi(d \sin \theta_2)/\pi$. A receiver output signal $S_{c1}$ of the first processor 330 at output port 334 is expressed as:

$$S_{c1}=S_1 \sin(\omega t+\phi_1+D_1)+S_2 \sin(\omega t+\phi_2+D_1)+S_2 \sin(\omega t+\omega_2+D_2)$$

The output $S_{c1}$ can also be written:

$$S_{c1} = S_1\left[\sin\left(\tfrac{\pi}{2}-b_1\right)+\sin\left(\tfrac{\pi}{2}-b_1+\Delta D_1\right)\right]\sin(\omega t+\phi_1+b_1) + S_2\left[\sin\left(\tfrac{\pi}{2}-b_{21}\right)+\sin\left(\tfrac{\pi}{2}-b_{21}+\Delta D_{21}\right)\right]\sin(\varpi t+\phi_2'+b_{21})$$

where $b_1=\Delta D_1/2$, $b_{21}=\Delta D_{21}/2$, $\phi_2'=\phi_2+D_1$, $\Delta D_{21}=D_2-D_1$, $\Delta D_{21}=D_2-D_1=0$.

Figure 2:
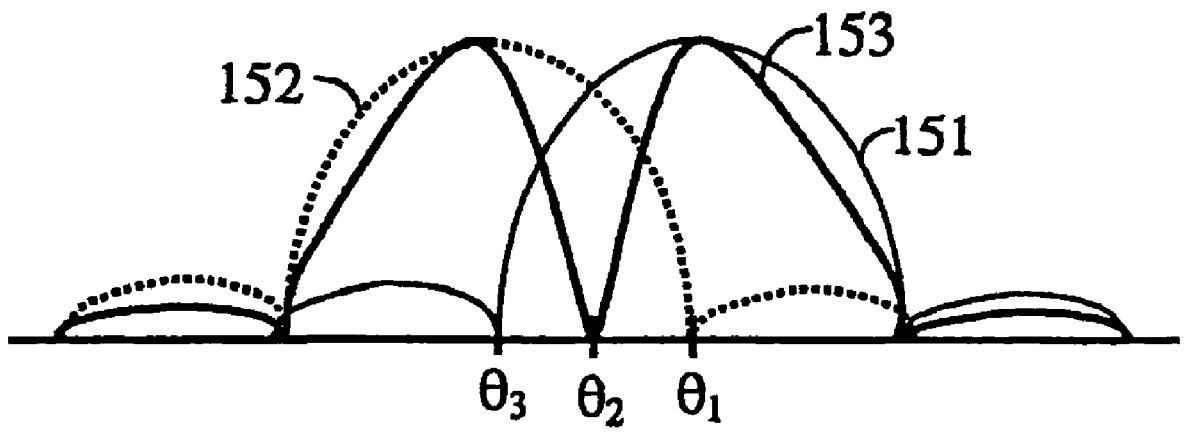
FIG. 2 is a graphic illustration of beam pattern components that comprise an interferometric beam pattern.

The delay factor $D_1$ applied to signals induced at antenna 101 causes the antenna array 100 to have maximum signal reception in the direction $\theta_1$. In FIG. 2, the direction $\theta_1$ represents the orientation direction of a first main beam 151 of the array's 100 receiver output signal $S_{c1}$. As the location of a source, such as the second source 92, departs from the orientation direction $\theta_1$, the responsiveness of the array 100 to the source 92 diminishes. The responsiveness of the array 100 to the second source 92 is nulled when the delay difference $\Delta D_{21}$ equals a half-cycle of the signal's 129 wavelength $\lambda$, resulting in totally destructive interference. In this case, however, it is assumed that the direction $\theta_2$ of the second source 92 is inside the beam width of the first main beam 151. The invention is able to provide a null in the direction $\theta_2$, thus decreasing the width of the main beam 151 without reducing the magnitude of the main beam's 151 peak.

The receive signals $S_{11}$, $S_{12}$, $S_{21}$, and $S_{22}$ are coupled to a second weight-and-sum processor 340. Signals $S_{11}$ and $S_{12}$ are delayed by an amount $D_3$ and adjusted in gain by a first weighting element 341 before being summed together with signals $S_{21}$ and $S_{22}$ in a second combining circuit 343. The second processor 340 may also include a second weighting element 342 coupled between the second antenna 102 and the combining circuit 343. For the purpose of this discussion, the second weighting element 342 does not provide delay or gain adjustment. A receiver output signal $S_{c2}$ at output port 344 is expressed as:

$$S_{c2}=S_1 \sin(\omega t+\phi_1'')+S_1 \sin(\omega t+\phi_1''+\Delta D_{13})+S_2 \sin(\omega t+\phi_2'')+S_2 \sin(\omega t+\phi_2''+\Delta D_{23})$$

where $.\phi_1''=\phi_1+D_3$, $\phi_2''=\phi_2+D_3$, $\Delta D_{13}=D_1-D_3$, $\Delta D_{23}=D_2-D_3$. $S_{c2}$ may also be expressed as:

$$S_{c2} = S_1\left[\sin\left(\tfrac{\pi}{2}-b_{13}\right)+\sin\left(\tfrac{\pi}{2}-b_{13}+\Delta D_{13}\right)\right]\sin(\omega t+\phi_1''+b_{13}) + S_2\left[\sin\left(\tfrac{\pi}{2}-b_{23}\right)+\sin\left(\tfrac{\pi}{2}-b_{23}+\Delta D_{23}\right)\right]\sin(\omega t+\phi_2''+b_{23})$$

where $b_{13}=\Delta D_{13}/2$ and $b_{23}=\Delta D_{23}/2$.

A second main beam 152 representing the receiver output signal $S_{c2}$ has an orientation direction $\theta_3$ relative to the direction of normal incidence 90. The output receive signals $S_{c1}$ and $S_{c2}$ are combined by a third weight-and-sum processor 350, which outputs a composite receive signal $S_{c3}$. The signal $S_{c3}$ is represented by an interferometric beam pattern 153 in FIG. 2 that has a null in the direction $\theta_2$. Before being summed in a combining element 353, the signal $S_{c1}$ is delayed by $D_4$ and adjusted in magnitude by a scalar weight factor g in a weighting element 351. The value of $D_4$ is an amount required to match the phases of the contributions of signals from the second source 92 to $S_{c1}$ and $S_{c2}$: $D_4=\phi_2''+b_{23}-\phi_2'-b_{21}=(D_3-D_1)/2$. The scalar weight factor g has the value:

$$g = \frac{\left[\sin\left(\tfrac{\pi}{2}-b_{23}\right)+\sin\left(\tfrac{\pi}{2}-b_{23}+\Delta D_{23}\right)\right]}{\left[\sin\left(\tfrac{\pi}{2}-b_{21}\right)+\sin\left(\tfrac{\pi}{2}-b_{21}+\Delta D_{21}\right)\right]}$$

The magnitude-adjusted delay-adjusted signal $S_{c1}$ is subtracted from signal $S_{c2}$ to cancel the responses of the main beams 151 and 152 to a source, such as source 92 in the direction $\theta_2$, to provide the composite receive signal:

$$S_{c3} = gS_1\left[\sin\left(\tfrac{\pi}{2}-b_1\right)+\sin\left(\tfrac{\pi}{2}-b_1+\Delta D_1\right)\right]\sin(\omega t+\phi_1+b_1+D_4) - S_1\left[\sin\left(\tfrac{\pi}{2}-b_{13}\right)+\sin\left(\tfrac{\pi}{2}-b_{13}+\Delta D_{13}\right)\right]\sin(\omega t+\phi_1''+b_{13})$$

The delay $D_3$ may be selected so that $\Delta D_{13}=\pi$: $D_3=\pi(2d \sin \theta_1-\lambda)/\lambda$. Then the second main beam 152 has a null in the direction $\theta_1$ of the first source 91 but is non-null in the direction $\theta_2$ of the second source 92. In this case, the interferometric beam pattern 153 is narrower than the first main beam 151 but has the same peak magnitude as the first main beam 151.

Signal decorrelation occurs between the antennas 101 and 102 when radiation having non-zero bandwidth is incident upon the array 100 from some angle other than the broadside direction. The propagation time delay of the radiation incident at each pair of antennas, such as antennas 101 and 102, produces a phase shift that is proportional to the signal frequency f. Therefore, complex weights $W_n(f_1)$ required to null a signal at one frequency $f_{-1}$ will be slightly different from weights $W_n(f_2)$ required to null a signal at another nearby frequency f.sub.2. If the interfering signal has a significant bandwidth and if the signal arrives from some angle other than broadside, the array 100 will require several closely spaced nulls to null all frequency components simultaneously.

The antenna array 100 may have a plurality M of reception patterns corresponding to a plurality of signal frequencies $f_m$. Each m of these reception patterns is given by the following equation:

$$R_a(\theta)_m = \sum_{n=-N}^{N} \frac{I_{am}}{I_o} e^{inkd\cos\theta}$$

where 2N+1 is the number of array elements, $I_{nm}$ is the electrical excitation current produced by the weighting of induced signals $S_{nm}$ at each element n, k is the wavenumber of the excitation current, d is the interelement spacing, and $\theta$ is the azimuthal direction in the plane of the array 100. Control of the radiation pattern $R_a(\theta)_m$ is achieved by relative positioning of the elements n (number N and spacing d) and the relative electrical excitations $I_{nm}$ of the individual array elements n.

Figure 3:
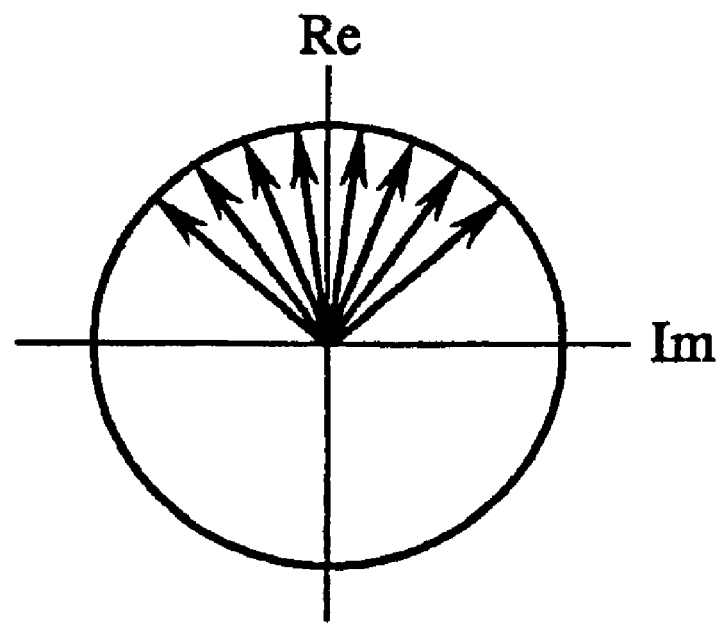
FIG. 3 is a plot of antenna element excitation phasors on the complex plane.

FIG. 3 illustrates a sum of phasors that represents the radiation pattern $R_a(\theta)_m$ of a uniformly excited array: $I_{nm}/I_0=1$. At $\theta=\pi/2$, all the phasors are real and add to a maximum, which is the peak of the main lobe of the radiation pattern $R_a(\theta)_m$. As $\theta$ departs from $\pi/2$, the phasors fan out across the complex plane. A minimum occurs at $\theta_{1\ min}$ for $$\cos\theta_{1min} = \pm\frac{\lambda}{L}$$

where $\lambda$ is the signal wavelength and L is the length of the array 100: $L=(2N+1)d$. This could be represented by a phasor diagram, such as the one shown in FIG. 3, where the phasors have fanned out so that they are equally spaced in the complex plane. Subsequent maxima occur at $$\cos\theta_{nmin} = \pm\frac{n\lambda}{L}$$

and correspond to sidelobes of the radiation pattern $R_a(\theta)_m$. The sidelobes can be reduced in height relative to the main lobe by tapering the magnitudes of the excitation currents $I_{nm}$ toward the ends of the array 100. However, the phasors will fan out beyond one full sheet in the complex plane before the first minimum occurs, resulting in broadening of the main lobe. This and other methods of aperture synthesis, such as Dolph-Chebyshev and Taylor synthesis, are oriented toward reducing sidelobe levels. However, these techniques are used in the present invention for adjusting the main lobe and the position of the minima.

Figure 4:
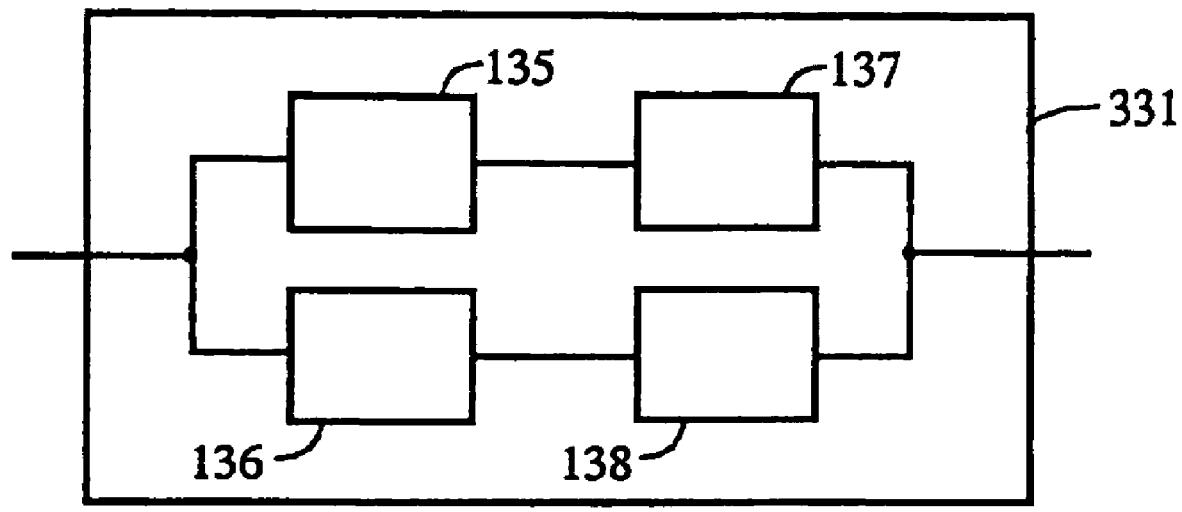
FIG. 4 illustrates components of a beam-shaping circuit described as part of the embodiment of the present invention.

FIG. 4 shows the components of the weighting element 331, which define it as a beam-shaping circuit. The other weighting elements 332, 341, and 342 may similarly be designed as beam-shaping circuit 331. A distributed-frequency signal $S_{11}$ comprising two frequency components $S_{11}(f_1)$ and $S_{11}(f_2)$ is input to the weighting element 331 where it is coupled through a parallel arrangement of a first and a second filter 135 and 136, respectively, which separate the signal components $S_{11}(f_1)$ and $S_{11}(f_2)$. The first filter 135 allows through-put of the first signal component $S_{11}(f_1)$, and the second filter 136 allows through-put of the second signal component $S_{11}(f_2)$. The first signal component $S_{11}(f_1)$ is weighted by a first weighting element 137, and the second signal component $S_{11}(f_2)$ is weighted by a second weighting element 138. Thus each of the signal components is adjusted in magnitude in accordance with its frequency $(f_1)$ or $(f_2)$ by the beam-shaping circuit 331. The weighted components $I_{11}$ and $I_{12}$ are then combined after acquiring the frequency-dependent weights. Likewise, signal $S_{12}$ is separated into its components by frequency, separately weighted, and then combined.

Figure 5:
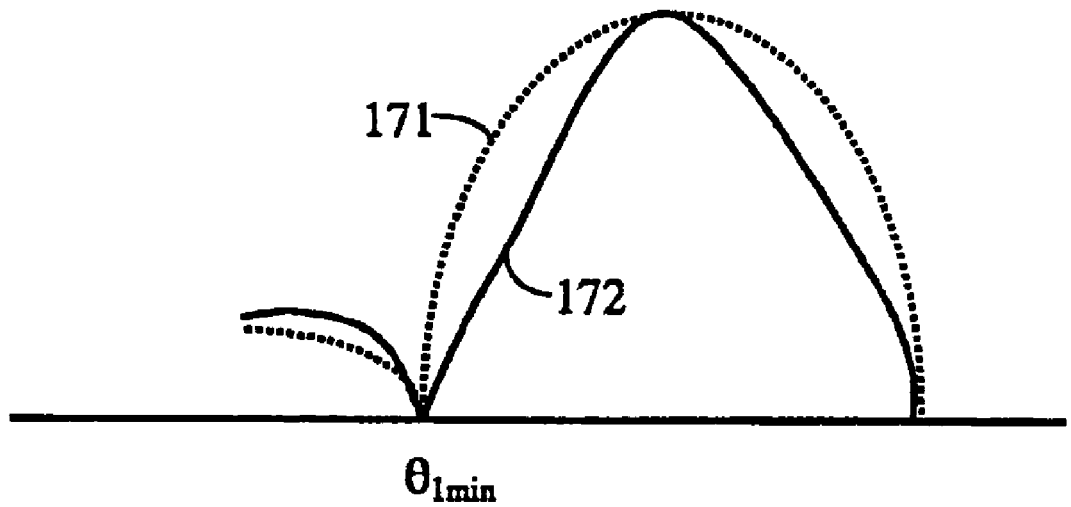
FIG. 5 is a graphic illustration of two beam patterns produced by signals having different frequencies when shaped by a beam-shaping circuit of the present invention.

In this case, signals $I_{n1}$ uniformly excite the array 100 ($I_{n1}=I_0$ for all n), whereas the signals $I_{n2}$ are tapered in magnitude toward the ends of the antenna array 100. FIG. 5 shows a first and second reception radiation pattern 171 and 172 produced by the array 100 when it is excited by the weighted components $I_{n1}$ and $I_{n2}$. Because the first minima $$\theta_{1min} = \cos^{-1}\left(\pm\frac{\lambda}{L}\right)$$

depends on the wavelength $\lambda$ it will not occur at the same position $\theta_{1\ min}$ for different signal wavelength values $\lambda_1$ and $\lambda_2$ ($\lambda=c/f$, $\lambda_1>\lambda_2$) if the excitations $I_{n1}$ and $I_{n2}$ are similar. The beam-shaping circuit 331 broadens the main beam of the second radiation pattern 172 to match the broader main beam of the first radiation pattern 171 resulting from the larger signal wavelength $\lambda_1$ of the corresponding excitation signals $I_{n1}$. Each of the radiation patterns 171 and 172 has a first minima which is located at $\theta_{1\ min}$. Thus, the antenna array 100 will neither transmit nor receive from the azimuthal direction $\theta_{1\ min}$.

The distributed-frequency characteristics of the signal S.sub.1 may imply a number m greater than two of the discreet signal frequencies. The signal S.sub.1 then may be separated into m signals, each of the m signals being filtered by a filter (not shown) for providing a total of m signal components separated by frequency f.sub.m. Each of the signal components may be adjusted by a weighting element (not shown), the weighting elements providing a frequency-dependent weight to each of the signal components.

The distributed frequency characteristics of the signal $S_1$ may imply a broad continuous frequency band. In this case, the signal $S_1$ may be divided into a plurality of discreet frequencies $f_m$ in a similar manner as explained above. Alternatively, the signal $S_1$ may have a continuous frequency-dependent weight applied to it in which the value of the weight applied to the signal $S_1$ obtains its frequency-dependent characteristics from the frequency-dependent characteristics of impedance elements (not shown) used to divide or provide gain to the signal $S_1$.

Weighting elements, such as the weighting elements 137 or 138, may provide complex weights to signals $S_1$ and $S_2$. The complex weights may contain progressive phase factors that steer the antenna pattern 171 or 172 in order to position a minima in a predetermined spatial region. In this case, a predetermined spatial region is the azimuthal location of a signal source at which we attempt to orient the direction of the minima of the beam patterns 171 and 172 generated by the array 100. However, another predetermined spatial region may require reception of non-minima portions of the beam patterns 171 and 172. A predetermined spatial region may include multiple directions in which the beam patterns 171 and 172 must have minima or a predetermined ratio of magnitudes with respect to each other.

In the same way that a plurality of weights can be applied to receive signals induced at each antenna 101 and 102 to create multiple overlapping reception beam patterns 151 and 152, a plurality of weights $W_m$ may be applied to a transmit signal $X_{Tn}$ at each n of the antennas 101 and 102 to generate multiple transmit beam patterns that overlap at some predetermined location. FIG. 1 shows an interferometric transmitter 356 of the present invention comprising a transmitter 350 coupled to an interferometric transmit signal adapter 365, which is coupled to the antennas 101 and 102. The adapter 365 includes a first and second weighting processor 360 and 370 for each antenna 101 and 102, respectively.

A transmit signal $X_T$ generated by the transmitter 350 is coupled into the first processor 360 and split into a first and a second split transmit signal, $X_{T1}$ and $X_{T2}$. A first weighting element 361 applies a first predetermined weight $W_{11}$ to the first signal $X_{T1}$. A second weighting element 362 applies a second predetermined weight $W_{12}$ to the second signal $X_{T2}$. The first and second weighting elements 361 and 362 are coupled to a combining circuit 363 for combining the weighted signals $W_{11} \cdot X_{T1}$ and $W_{12} \cdot X_{T2}$ into a first combined signal $X_{TC1}$. The first combined signal $X_{TC1}$ is amplified by a first amplifier 364 to produce a first excitation signal $X_{E1}$, which is radiated at the first antenna 101. The first amplifier 364 may be eliminated, particularly if the three-port device 104A includes amplification means.

The transmit signal $X_T$ is also coupled into the second processor 360, which splits the signal $X_T$ into a third and a fourth split transmit signal, $X_{T3}$ and $X_{T4}$. A third weighting element 371 applies a third predetermined weight $W_{21}$ to the third signal $X_{T3}$, and a fourth weighting element 372 applies a fourth predetermined weight $W_{22}$ to the fourth signal $X_{T4}$. The third and fourth weighting elements 371 and 372 are coupled to a combining circuit 373 for combining the weighted signals $W_3 \cdot X_{T3}$ and $W_4 \cdot X_{T4}$ into a second combined signal $S_{TC2}$. The second combined signal $S_{TC2}$ is amplified by a second amplifier 374 to produce a second excitation signal $S_{E2}$, which is radiated at the second antenna 102. The second amplifier 374 may be eliminated, particularly if the three-port device 104B includes amplification means. In this case, the weight factors $W_{11}$ and $W_{21}$ are phased so that the excitation of the array produces a first transmit antenna pattern shown as pattern 151 in FIG. 2 that has a main beam orientation in the direction $\theta_1$ and also produces a second transmit antenna pattern represented by pattern 152 having a main beam orientation in the direction $\theta_3$. The beams 151 and 152 combine destructively to provide a null in the direction $\theta_2$.

The patterns 151 and 152 may induce complementary signals in a receiver (not shown) located in direction $\theta_2$. Alternatively, the patterns 151 and 152 may be seperable from each other at the receiver (not shown), the separability being provided by the signals $S_{E1}$ and $S_{E2}$, which have different frequencies, time-domains, polarizations, or the like. When processed and combined, the patterns 151 and 152 provide a null in the direction $\theta_2$.

The transmit signal $X_T$ has a carrier frequency f whose value changes as the signal $X_T$ is generated. The transmitter 350 includes a frequency-control processor 358 that changes the carrier frequency f of the transmit signal $X_T$ and provides control to the weighting elements 361, 362, 371, and 372 for changing the values of the weights $W_{11}$, $W_{12}$, $W_{21}$, and $W_{22}$ with respect to frequency f. The values of the weights $W_{11}$, $W_{12}$, $W_{21}$, and $W_{22}$ are adjusted to provide the appropriate aperture synthesis to maintain a null in the direction $\theta_2$ for all values of signal frequency f generated by the transmitter 350.

The beam width of a uniformly excited array is based on the array length L in the Fourier transform equation:

$$f(x) = \{1(1 \times 1 \le d), 0(1 \times 1 > d)\}$$

$$F(k) = \frac{1}{\sqrt{2\pi}} \int_{-d}^{+d} e^{ikx} dx = \sqrt{\frac{2}{\pi} \frac{\text{Sin}(dk)}{k}}$$

The Fourier transform of a linear aperture function produces a sinc function that illustrates the beam pattern amplitude produced by an antenna array. The number of array elements and their spacing determine how many main beams occur in the visible antenna pattern.

Figure 6:
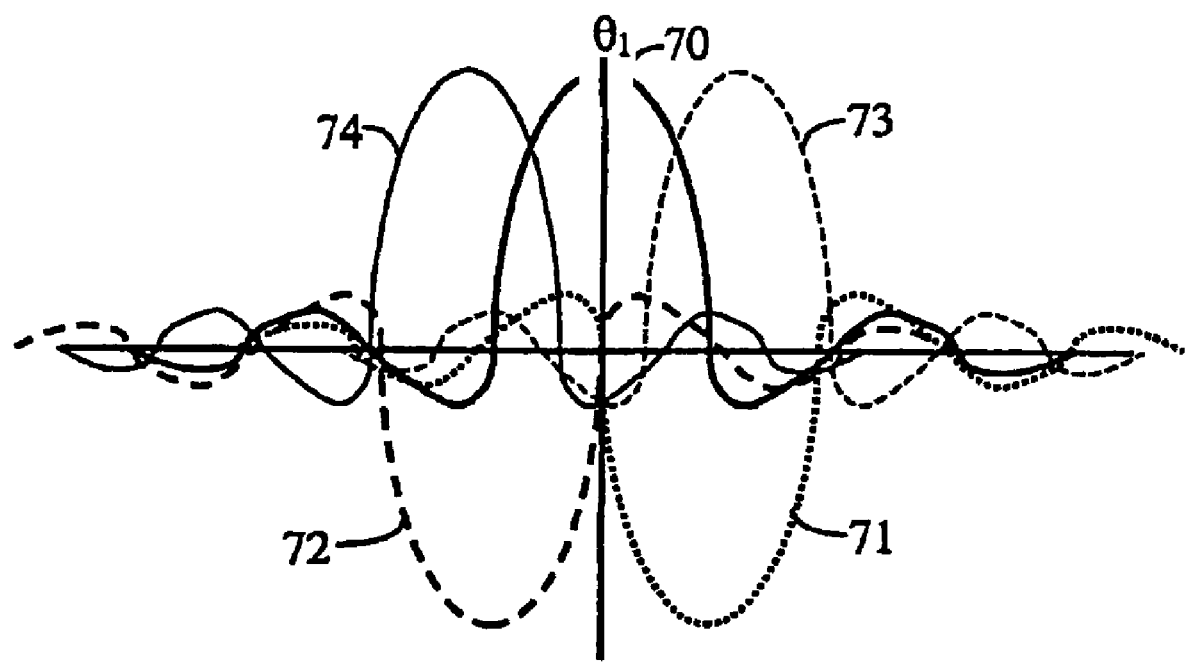
FIG. 6 is a graphic illustration of five individual beam patterns produced by an antenna array of the present invention that is excited by five excitation signals.

FIG. 6 shows a beam pattern generated by an antenna array that is excited according to a method of the present invention. There is a plurality N of antenna elements (not shown) in the array. A transmit signal X is split into N transmit signals $X_n(t)$, where n=1 to N. Thus, the distribution of transmit signals to the antenna array is $X=[X_1(t), X_2(t), \ldots, X_N(t)]$. The vector X is multiplied by a complex weight vector $W=[W_1, W_2, \ldots, W_N]^T$ to produce an array output $S=W^T X$. The array output S is ordinarily a sum of one particular (m=1) weighted distribution of split transmit signals $X_n(t)$, providing a single beam pattern. In the present invention, each of the N elements $W_n$ of the weight vector W is a vector having a number M of elements $w_{nm}$ equal to a number (M=5 in this case) of individual output signals $s_m(t)$ in the output signal S. The individual output signals $s_m(t)$ sum together to provide an interferometric composite beam pattern 80 shown in FIG. 7. In the case where cancellation signals are multiplexed onto a plurality $n_c$ of channels, the transmit signal vector's X elements, $X_n$, may be represented as a vector having a plurality of components equal to $n_c$.

The array produces a first array output signal $s_1(t)$ with an antenna beam amplitude pattern 70 that has a peak oriented in a direction $\theta_1$ and a beam width defined by a pair of first minima symmetrically positioned at a distance $\theta_{1\ min}$ on either side of the orientation direction $\theta_1$. A second and a third array output signal $s_2(t)$ and $s_3(t)$ are produced by the antenna array 100 and have beam amplitudes indicated by beam patterns 71 and 72, respectively. The second and third beam patterns 71 and 72 have the same beam width as the first pattern 70. The second pattern 71 is oriented in a direction $\theta_2 = \theta_1 + \theta_{1\ min}$ and the third pattern 72 is oriented in a direction $\theta_3 = \theta_1 - \theta_{1\ min}$. A fourth and a fifth output signal $s_4(t)$ and $s_5(t)$ are produced by the array having beam amplitudes illustrated by a fourth and a fifth pattern, 73 and 74, respectively. The fourth pattern has its peak oriented in a direction $\theta_4 > \theta_1 + \theta_{1\ min}$ and the fifth pattern has its peak oriented in a direction $\theta_5 < \theta_1 - \theta_{1\ min}$.

The fourth and fifth beam patterns 73 and 74 each have beam widths that are smaller than the beam width of the first pattern 70. The second and third patterns 71 and 72 are illustrated as having negative amplitude peaks because these patterns 71 and 72 represent cancellation signals for canceling signals shown in FIG. 6 with positive amplitude peaks, such as patterns 70, 73, and 74. The cancellation signals 71 and 72 induce receive signals in a remote antenna (not shown) that cancel the array's transmission at that location. The cancellation signals may also provide a spatially diverse gain to the incident radiation at the antenna array 100 in order to null the array's reception of signals from specific spatial locations. The methods of inducing cancellation signals in electromagnetic receivers and producing cancellation fields at remote locations is discussed in PCT patent application PCT/US/08247, which is hereby incorporated by reference.

Figure 7:
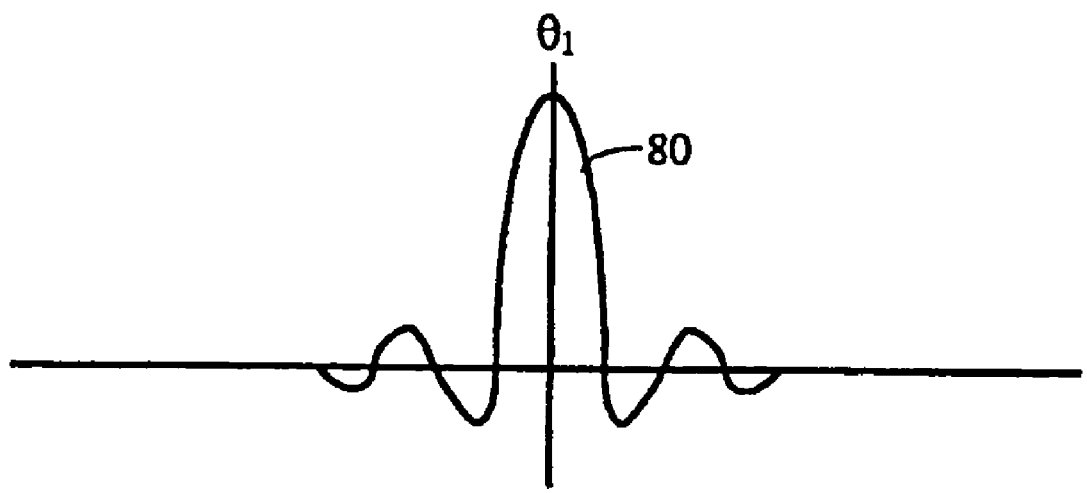
FIG. 7 is a graphic illustration of interferometric beam-forming comprising the sums of five individual beam patterns.

FIG. 7 illustrates the beam pattern 80 that results from the sum of the beam patterns 70, 71, 72, 73, and 74 in FIG. 17. The beam pattern's 80 peak has a beam width equal to $\theta_{1\ min}$ and an amplitude that is approximately equal to the amplitude of the first pattern 70 in FIG. 6. To cancel signals in the first channel, the cancellation signals 71 and 72 may be multiplexed into a separate channel separated by frequency, time, polarization, or the like before being processed at the remote antenna (not shown).

FIG. 1 shows a spatial demultiplexer 403 of the present invention which makes use of known spatial gain variations of a plurality of receive signals $s_n(t)$ across the antenna array. The antenna array has a plurality M of antenna elements 101 and 102, in this case M=2. An electrical receive signal $r_m(t)$ is induced at each antenna element by incoming signals $s_n(t)$, and is expressed by:

$$r_m(t) = \sum_{n=1}^{N} a_n s_n(t) e^{i\pi(x_m \sin\vartheta_n + y_m \cos\vartheta_n)} + n_m(t)$$

where $a_n$ is the antenna gain, $x_m$ and $y_m$ are Cartesian coordinates of the $m^{th}$ antenna element location normalized by signal wavelength $\lambda$, $\theta_n$ is the angle of incidence of the signals $s_n(t)$, and $n_m(t)$ is a noise component corresponding to the $m^{th}$ antenna element. In this case, the two antenna elements 101 and 102 receive two incoming signals $s_1(t)$ and $s_2(t)$ from sources 91 and 92, which induce two receive signals:

$$r_1(t) = a_1 s_1(t) e^{i\pi(x_1 \sin \theta_1 + y_1 \cos \theta_1)} + a_2 s_2(t) e^{i\pi(x_1 \sin \theta_2 + y_1 \cos \theta_2)}$$

$$r_2(t) = a_1 s_1(t) e^{i\pi(x_2 \sin \theta_1 + y_2 \cos \theta_1)} + a_2 s_2(t) e^{i\pi(x_2 \sin \theta_2 + y_2 \cos \theta_2)}$$

If the sources 91 and 92 are very close together in angular position: $\theta_1 \approx \theta_2 \approx \theta$, then the equations for the receive signals are simplified:

$$r_1(t) = e^{i\pi(x_1 \sin \theta + y_1 \cos \theta)} [a_1 s_1(t) + a_2 s_2(t)]$$

$$r_2(t) = e^{i\pi(x_2 \sin \theta + y_2 \cos \theta)} [a_1 s_1(t) + a_2 s_2(t)]$$

The exponent represents a steering vector of the array excitation and merely acts as a scaling factor for the expressions in the brackets, which are identical for the two receive signals $r_1(t)$ and $r_2(t)$. These two equations are algebraically identical, and therefore reduce to a single equation with two unknown quantities $s_1(t)$ and $s_2(t)$. This means that the two signals $s_1(t)$ and $s_2(t)$, cannot be resolved. In order to explicitly solve for the unknowns $s_1(t)$ and $s_2(t)$ it is necessary to develop at least two algebraically unique equations in $s_1(t)$ and $s_2(t)$. This is accomplished by providing the incoming signals with spatial gain variations: $s_n(t) \cong s_n(x,y,t)$.

The magnitude of each incoming signal at each antenna 101 and 102 varies in accordance with the spatial gain characteristics of the signal: $s_{mn} \cong s_n(t) b_{mn}$, where $b_{mn}$ is a known weight factor expressing the magnitude of the signal $s_n(t)$ at the $m^{th}$ antenna element. The received signals are expressed by the following equations:

$$r_1(t) = C_1 [a_1 s_1(t) b_{11} + a_2 s_2(t) b_{12}]$$

$$r_2(t) = C_2 [a_1 s_1(t) b_{21} + a_2 s_2(t) b_{22}]$$

The constants $C_1$ and $C_2$ represent the steering vector and are comprised of known quantities. These constants can be absorbed into the values of $b_{mn}$ or the measured receive signals $r_1(t)$ and $r_2(t)$. Thus, the above equations allow a method of solving for the signals $s_1(t)$ and $s_2(t)$ explicitly. The signals $s_1(t)$ and $s_2(t)$ can be separated by weighting and summing the receive signals $r_1(t)$ and $r_2(t)$ in the following manner:

$$r_1(t) - \frac{b_{11}}{b_{21}} r_2(t) = a_2 s_2(t) \left[ b_{12} - \frac{b_{22} b_{11}}{b_{21}} \right]$$

$$r_1(t) - \frac{b_{12}}{b_{22}} r_2(t) = a_1 s_1(t) \left[ b_{11} - \frac{b_{12} b_{21}}{b_{22}} \right]$$

These equations identify the boundary condition $b_{11} b_{22} \neq b_{12} b_{21}$, which represents the spatial gain profile of the signals $s_1(t)$ and $s_2(t)$ necessary for allowing resolution of the two sources.

Each of the spatially separated antenna elements 101 and 102 receive a plurality of signals $s_1(t)$ and $s_2(t)$ with known spatial gain characteristics $b_{nm}$ at the receiving elements 101 and 102. Furthermore, the proportionality of the spatial gain characteristics $$\frac{b_{nm}}{b_{n'm}}$$

($n \neq n'$) at each antenna element 101 and 102 is unique, as required by the boundary conditions described above. The first receive signal $r_1(t)$ is induced at antenna 102. The second receive signal $r_2(t)$ from antenna element 101 is delayed by a delay element 400, providing a delay equal to the difference in transit time for electromagnetic radiation to propagate from the desired source(s) to each of the antenna elements 101 and 102. This is done to maximize reception of incident radiation from the desired source(s). The delayed signal $r_2(t)$ is split into a first and a second component $r_{21}(t)$ and $r_{22}(t)$. The first component $r_{21}(t)$ has a weight $b_{11}/b_{21}$ applied to it by a first weighting element 401, and the second component $r_{22}(t)$ has a weight $b_{12}/b_{22}$ applied to it by a second weighting element 402. It is apparent that the delay element 400 could have been incorporated into the weighting elements 401 and 402. The first receive signal $r_1(t)$ from antenna element 101 is split into a first and a second component $r_{11}(t)$ and $r_{12}(t)$. The first component $r_{11}(t)$ is coupled through a weighting element 421 and then into a first combining circuit 411. In this case, the signals $s_1(t)$ and $s_2(t)$ do not have significant distributed-frequency characteristics so the weighting element 421 provides neither magnitude-adjustment nor delay to the first component $r_{11}(t)$. Likewise, the second component $r_{12}(t)$ is coupled through a weighting element 422 into a second combining circuit 412. The weighting element 422 also provides neither magnitude-adjustment nor delay to signal $r_{12}(t)$. The weighted first component $r_{21}(t)$ is subtracted from the first signal's first component $r_{11}(t)$ in the first combining circuit 411. The weighted second component $r_{22}(t)$ is subtracted from the first signal's second component $r_{12}(t)$ in the second combining circuit 412. Outputs of the combining circuits 411 and 412 are proportional to the transmitted signals $S_1(t)$ and $s_2(t)$, respectively. These outputs are coupled to a receiver 430, which may provide further signal processing such as equalization.

If the signals $s_1(t)$ and $s_2(t)$ received by the antennas 101 and 102 have distributed-frequency characteristics that cause the receive signals $r_1(t)$ and $r_2(t)$ to have variable magnitudes with respect to frequency, the weighting elements 401, 402, 421, and 422 are preferably beam-shaping circuits as described in reference to FIG. 4.

Figure 8:
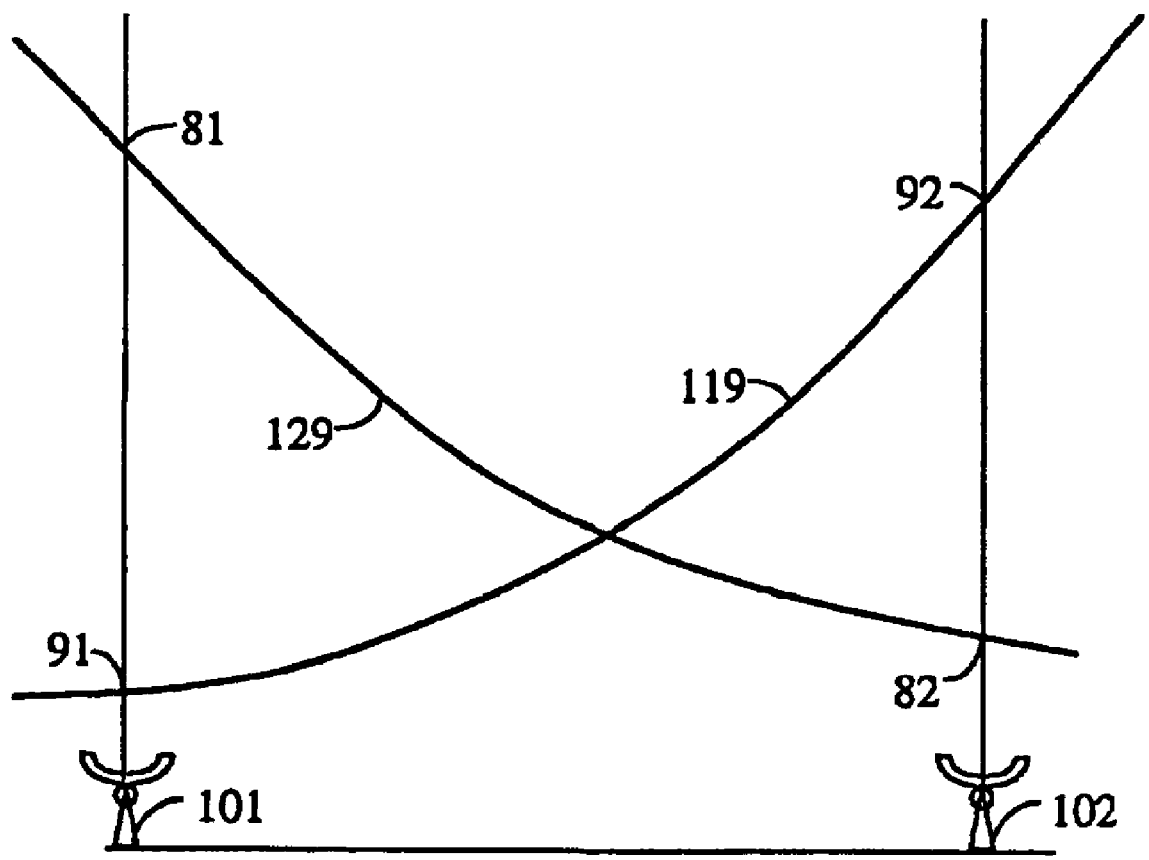
FIG. 8 is a graphic representation of spatial gain distribution of two receive signals across two antenna elements of the antenna array of the present invention.

FIG. 8 illustrates intensity profiles (spatial gain distributions) of the incident radiation 119 and 129 from the remote sources 91 and 92 in the vicinity of antennas 101 and 102. A training sequence may be transmitted by the sources 91 and 92 in which the signals 119 and 129 are known, thus allowing for calibration of the weights of the spatial demultiplexer 403. The first antenna 101 receives the first signal 119 having a first magnitude 91 and the second signal 129 having a first magnitude 81. The second antenna 102 receives the first signal 119 at a second magnitude 92 and the second signal 129 at a second magnitude 82. The spatial demultiplexer 403 may direct beam-shaping processes of the remote sources 91 and 92 to adjust the spatial gain distributions of the signals 119 and 129 at the array 100 in order to optimize reception. Reception-quality may be measured as a signal-to-noise or a signal-to-noise-plus-interference relationship. Communication between the array 100 and the remote sources 91 and 92 for optimizing reception may be accomplished by providing a feedback signal from the receiver 430 to the sources 91 and 92 that indicates the degree of reception quality. Shaping of the spatial gain distributions by the sources 91 and 92 may be accomplished by aperture synthesis, beam-steering, interferometric combining of multiple beam patterns, microwave lensing, or the like.

Spatial multiplexing of communications signals and demultiplexing of those signals utilizing known spatial gain distribution ratios of the received signals $s_1(t)$ and $s_2(t)$ has been shown with respect to RF communications signals. However, this method of canceling interference may also be applied to electromagnetic signals in other frequency domains, such as optical frequencies. Optical transmitters may include collimated sources, such as lasers.

In the case where the sources 91 and 92 have any angular separation, a microwave lens (not shown) may be utilized to provide gain differentials between the receive signals $s_1(t)$ and $s_2(t)$ which the lens then directs to a plurality of receivers (not shown). A microwave lens (not shown) receives incident radiation and focuses it onto receivers (not shown) located in the focal plane of the lens (not shown). The position of each receiver (not shown) receives an amount of the focused radiation depending on the receiver position and the directions of arrival $\theta_1$ and $\theta_2$ of the incident radiation. The angular separation between the sources 91 and 92 allows the lens (not shown) to adjust the spatial gain distribution of the signals $s_1(t)$ and $s_2(t)$ received by the receivers (not shown). The weight factors $b_{mn}$ corresponding to the receive signals $s_1(t)$ and $s_2(t)$ at the receivers (not shown) comprise the spatial gain distributions of the transmit signals transmitted by the sources 91 and 92 and a multiplicative lensing factor resulting for adjusting the spatial gain distribution that is ultimately "seen" by the receivers (not shown), which results from the focusing effect by the lens (not shown) on the incident radiation. The weight factors $b_{mn}$ may be determined by test sequences of known transmissions from the sources 91 and 92 or from calculations that utilize known spatial gain distributions transmitted by the sources 91 and 92, known angular $\theta_1$ and $\theta_2$ of the sources 91 and 92, and a known gain profile applied by the lens (not shown) to the receivers (not shown) relative to the directions of arrival $\theta_1$ and $\theta_2$ of incident radiation.

The spatial demultiplexer 403 has been described with respect to its use for separating signals $s_1(t)$ and $s_2(t)$ that have different known spatial gain distributions (described by weight factors $b_{mn}$) across the antenna elements 101 and 102. However, the spatial demultiplexer 403 may be used as a polarization demultiplexer to separate a plurality of received polarization signals $p_n(t)$ (n=1, ..., N), each having a known linear polarization $\phi_n$. Each antenna of the array 100, such as antennas 101 and 102, may include a linear polarizer (not shown) oriented in a predetermined direction $\phi$ for attenuating the received signals $p_n(t)$. The attenuation may be represented by an attenuation factor that has a value $\alpha_n = \cos^2(\phi - \phi_n)$ and that multiplies the intensity of each corresponding n received signal $p_n(t)$. The receive signals $p_n(t)$ have linear polarization orientations $\phi_n$ that are known. Consequently the signals $s_1(t)$ and $s_2(t)$ received at each antenna 101 and 102 have predetermined degrees of cross-polarization interference that are used to derive the weight factors $b_{mn}$. In the case where only two receive signals are collected, it is preferable that the polarizations $\phi_1$ and $\phi_2$ of the signals $s_1(t)$ and $s_2(t)$ be orthogonal with presumably no cross-polarization interference. However, the present invention relates to a system in which the polarizations $\phi_n$ of the receive signals $s_n(t)$ have known but interfering polarizations. The advantage of this method is that it provides for polarization demultiplexing of more than two linearly polarized signals $s_n(t)$.

Figure 9:
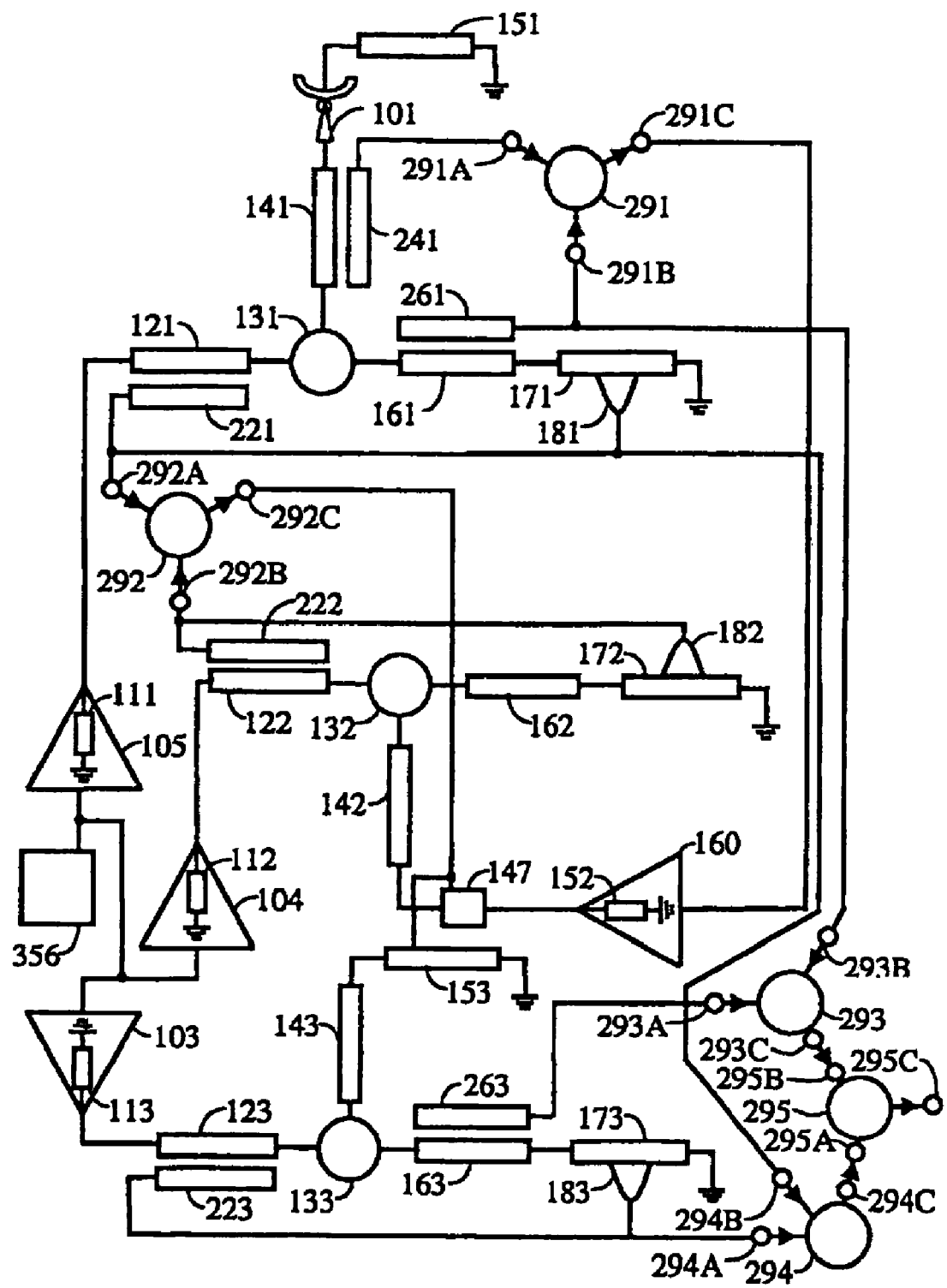
FIG. 9 is a diagram showing the components of a three-port isolator device described in the embodiment of the present invention.

An embodiment of an isolator three-port device 104 is shown in FIG. 9. This three-port device 104 represents one embodiment of the three-port devices 104A and 104B shown in FIG. 1. The transmitter 356 generates electrical signals represented by voltage $V_{SG}$, which are passed to the inputs of amplifiers 105, 104 and 103. The amplifiers 105, 104, and 103 provide gain to the input signal $V_{SG}$ represented by gains $g_1$, $g_2$, and $g_3$, respectively. The output impedance of each amplifier 105, 104 and 103 is represented by impedance elements 111, 112 and 113, respectively. The amplified signal from the output of the first amplifier 105 is represented by a first transmit current $i_{11T}$ that passes through an impedance element 121 to a three-port device 131. The three-port device 131 splits the transmit current $i_{11T}$ into a first reference signal $i_{13T}$ and an output transmit signal $i_{12T}$. The first reference signal $i_{13T}$ exits the three-port device 131 and passes through a first reference branch which comprises an impedance element 161 and a variable-impedance element 171. The variable impedance element 171 is coupled to an impedance controller 181. The output transmit signal $i_{12T}$ flows through a transmit branch that is comprised of an impedance element 141 and the antenna 101. The input impedance of the antenna 101 is represented as an antenna impedance element 151.

A second transmit current $i_{21T}$ from the second amplifier 104 passes through an impedance element 122 into a three-port device 132. The three-port device 132 splits the second transmit current $i_{21T}$ into a second reference signal $i_{23T}$ and a first dummy transmit signal $i_{22T}$. The second reference signal $i_{23T}$ exits the three-port device 132 and flows through a second reference branch that is comprised of an impedance element 162 and a variable-impedance element 172. The variable impedance element 172 is coupled to an impedance controller 182. The first dummy transmit signal $i_{22T}$ flows through a first dummy antenna branch that includes an impedance element 142, a variable distributed impedance element 147 and an output-impedance element 152. The output-impedance element 152 represents the output impedance of an amplifier 160.

A third transmit current $i_{31T}$ from the third amplifier 103 passes through an impedance element 123 to a three-port device 133. The three-port device 133 splits the third transmit current $i_{31T}$ into a third reference signal $i_{33T}$ and a second dummy transmit signal $i_{32T}$. The third reference signal $i_{33T}$ flows from the three-port device 133 through an impedance element 163 and then through a variable impedance element 173. The variable impedance element 171 is coupled to an impedance controller 183. The second dummy transmit signal $i_{32T}$ exits the three-port device 133 and flows through a second dummy antenna circuit that includes an impedance element 143 and a variable distributed impedance element 153.

A first sensing network is comprised of a sensing element 241 coupled to impedance element 141, a second sensing element 261 coupled to impedance element 161, and a combining circuit 291. The electrical signals generated by the sensing elements 241 and 261 are input to the combining circuit 291 at input ports 291A and 291B, respectively. The output port 291C of the combining circuit 291 is coupled to the input of amplifier 160.

A second sensing network is comprised of a third sensing element 221 coupled to the impedance element 121, a fourth sensing element 222 coupled to the impedance element 122, and a combining circuit 292. The electrical signal generated at the sensing elements 221 and 222 are input to the input ports 292A and 292B of the combining circuit 292. The output port 292C of the combining circuit 292 is coupled to the variable impedance element 147 and also coupled to the variable impedance element 153. An output of the sensing element 221 is coupled to the impedance controller 181, and an output of the sensing element 222 is coupled to the impedance controller 182.

A third sensing network is comprised of a fifth sensing element 223 coupled to the impedance element 123, a combining circuit 294 connected to the sensing element 223 through a first input port 294A, and a second input port 294B of the combining circuit 294 coupled to the sensing element 221. An output signal from the sensing element 223 is coupled to the impedance-controller 183.

A fourth sensing network is comprised of a sixth sensing element 263 coupled to the impedance element 163, an input port 293A of a combining circuit 293 coupled to the output of the sensing element 263, and an input port 293B coupled to the output of the sensing element 261. The output ports 293C and 294C of the combining circuits 293 and 294, respectively, are coupled to a combining circuit 295 through input ports 295B and 295A, respectively. The output port 295C of combining circuit 295 provides a receiver output signal from the antenna 101.

Circuit impedances are represented as lumped-circuit impedance elements, such as impedance elements 111, 112, 113, 121, 122, 123, 141, 142, 143, 147, 151, 152, 153, 161, 162, 163, 171, 172, and 173. Each of these lumped circuit elements is meant to convey an impedance comprised of inductance, capacitance resistance, and/or conductance. The antenna element 151 is modeled as a transmission line in that it has its inductance, resistance, capacitance, and conductance distributed along the line. Likewise, the variable distributed impedance elements 147 and 153 include distributed circuits or a combination of lumped circuit elements that approximate a distributed impedance. The three-port devices 131, 132, and 133 may be T-junctions, resistive dividers, non-reciprocal devices, such as circulators, or any such power divider. The sensing elements 221, 222, 223, 241, 261, and 263 sense electrical signal levels, either current or voltage, within the circuit at the locations represented by impedance elements 121, 122, 123, 141, 161, 163, respectively.

The values of the first, second and third transmit currents $i_{T11}$, $i_{T12}$ and $i_{T13}$ are as follows:

$$i_{T11} = \frac{(V_A/Z_1)}{((1/Z_1 + 1/Z_{in1})Z_{in1})}$$

$$i_{T12} = i_{T11} \frac{(R_3 + Z_3)}{(R_3 + Z_3 + R_2 + Z_2)}$$

$$i_{T13} = i_{T11} \frac{(R_2 + Z_2)}{(R_3 + Z_3 + R_2 + Z_2)}$$

where $Z_1$, $R_1$, $Z_3$, $R_3$, and $R_2$ are the values of impedance elements 111, 121, 161, 171, and 141, respectively, $Z_2$ is the value of the impedance elements 151, $Z_{in1}$ has the value of $R_1+(R_2+Z_2)\|(R_3+Z_3)$, and $V_A$ is the signal voltage applied by the amplifier 105 output, where $V_A=g_1 V_{SG}$. The voltage of the transmit signal at the output of the amplifier 105 is:

$$V_{T11} = \frac{(V_A/Z_1)}{(1/Z_1 + 1/Z_{in1})}$$

Sensing elements 241 and 261 output electrical signals that are proportional to electrical signals flowing through impedance elements 141 and 161, respectively. In this case, we require the first sum of impedances elements 161 and 171, which comprise the first reference branch, to be proportional to the second sum of impedance elements 141 and 151, which comprise the transmit branch. The values of impedance elements having either capacitive or inductive components will be frequency-dependent. Thus the proportionality between the first and second sums is preferably a real-valued constant. If we require $Z_2$ to be a real multiple of $Z_3$ ($Z_2=a Z_3$, where "a" is a real multiplier), the equations for transmit currents in the transmit branch and the first reference branch are as follows:

$$i_{T12} = i_{T11} \frac{a}{(a+1)} \text{ and } i_{T13} = i_{T11} \frac{1}{(a+1)}$$

It is preferable that the reference branch impedance be larger than the impedance of the transmit branch so that more transmitter power is routed through the transmit branch than the reference branch. Transmit efficiency is measured as the proportion of transmit power that is radiated by the antenna 101 relative to the transmit power at the output of the amplifier 105. It is particularly desirable to have a high (greater than 50 percent) transmit efficiency for far-field communications and remote sensing applications. Additionally, designing the reference branch for high power levels (power levels approaching the transmit power in the transmit branch) adds expense and bulk to the circuit design as more precautions are needed for heat-dissipation and inductive coupling. It is important to balance the benefits of reducing power-handling in the reference branch with the problems of manipulating low-power signals. Signal-to-Noise levels for low-power signals are more adversely affected by additive environmental noise, such as electromagnetic interference (EMI), and additive amplifier noise. Thus, the value of "a" will depend on a compromise between different sets of boundary conditions.

A voltage $V_R$ is generated by the antenna 101 in response to received electromagnetic radiation. An electrical receive current $i_{R12}$ flows through impedance element 141 as a result of this voltage $V_R$. The current $i_{R12}$ is split by the three-port device 131 into a pair of complementary receive signals $i_{R11}$ and $i_{R13}$. Current $i_{R11}$ flows through impedance elements 121 and 111, and current $i_{R13}$ flows through impedance elements 161 and 171. The receive currents are given by the following relationships:

$$i_{R12} = \frac{(V_R/Z_2)}{((1/Z_2 + 1/Z_{in2})Z_{in2})}$$

$$i_{R13} = i_{R12} \frac{(R_1/Z_1)}{(R_1 + Z_1 + R_3 + Z_3)}$$

$$i_{R11} = i_{R12} \frac{(R_3/Z_3)}{(R_3 + Z_3 + R_1 + Z_1)}$$

where $$Z_{in2} = R_2 + \frac{(R_1/Z_1)(R_3 + Z_3)}{(R_1 + R_3 + Z_1 + Z_3)}$$

The sensing element 261 is responsive to the electrical signals $i_{R12}$ and $i_{T12}$ flowing through the impedance element 161 and generates an electrical response signal $i_{S2}$. Likewise, the sensing element 241 is responsive to electrical signals $i_{R13}$ and $i_{T13}$ flowing through impedance element 141 and generates an electrical response signal $i_{S1}$. The responses $i_{S1}$ and $i_{S2}$ of the sensing elements 241 and 261 are adjusted in amplitude and phase relative to each other and combined in the combining circuit 291 such that the contributions of the transmit signals $i_{T12}$ and $i_{T13}$ cancel. The combining circuit 291 produces an electrical signal $i_{291}$ that is substantially proportional to the receive signal $i_{R12}$ at output 291C. This electrical signal $i_{291}$ is input to the amplifier 160, which injects a gain-adjusted version $i_{R22}$ of the signal $i_{291}$ into the first dummy antenna branch. The amplitude of the injected receive signal $i_{R22}$ is adjusted such that it is proportional to signal $i_{R12}$ by the same amount as the proportionality between the transmit signals $i_{T22}$ and $i_{T12}$. Furthermore, phase-adjustment in the combining circuit 291 provides a relative phase between the signals $i_{R22}$ and $i_{T22}$ that is substantially identical to the relative phase between the signals $i_{R12}$ and $i_{T12}$. The injected receive signal $i_{R22}$ flows through the impedance element 142 into the three-port device 132, which splits the injected signal $i_{R22}$ into complementary injected receive signals $i_{R21}$ and $i_{R23}$. The signal $i_{R21}$ flows through impedance element 122, and signal $i_{R23}$ flows through impedance element 162.

The signals $i_{R21}$ and $i_{T21}$ flowing through impedance element 122 are sensed by sensing element 222, which produces a proportional response signal $i_{S4}$. Likewise, the signals $i_{R21}$ and $i_{T21}$ flowing through impedance element 121 are sensed by sensing element 221, which also generates a response signal $i_{S3}$. The signals $i_{S3}$ and $i_{S4}$ from both sensing elements 221 and 222 are combined in the combining circuit 292, and an error signal $i_S$ is produced at the output 292C that represents any mismatch in the proportionality of the signals $i_{S3}$ and $i_{S4}$. Such a mismatch in proportionality is likely to occur when the impedance of the antenna 101 changes due to environmental conditions, such as aging, temperature variations, and movement relative to nearby electrically grounded conductive objects. The output 292C is connected to variable distributed impedance elements 147 and 153, whose impedances change by an amount dictated by the error signal $i_S$. The change in impedance of the variable impedance element 147 affects the error signal $i_S$. A logical circuit controller (not shown) within the variable impedance element 147 is responsive to the error signal $i_S$ and adjusts the impedance in order to minimize the magnitude of the error signal $i_S$.

The error signal is provides an accurate controlling reference for adjusting the impedances of impedance elements 147 and 153 because the split signal $i_{R21}$ from the injected signal $i_{R22}$ enables cancellation of the split signal $i_{R11}$ from the receive signal $i_{R12}$ in the combining circuit 292. This reduces the effect of the receive signal $i_{R12}$ on the error signal $i_{RS}$. The error signal $i_S$ may be used to control the effective impedance of the antenna 101, thus compensating for impedance changes by adjusting the impedance of a series impedance element such as impedance element 141.

Figure 11:
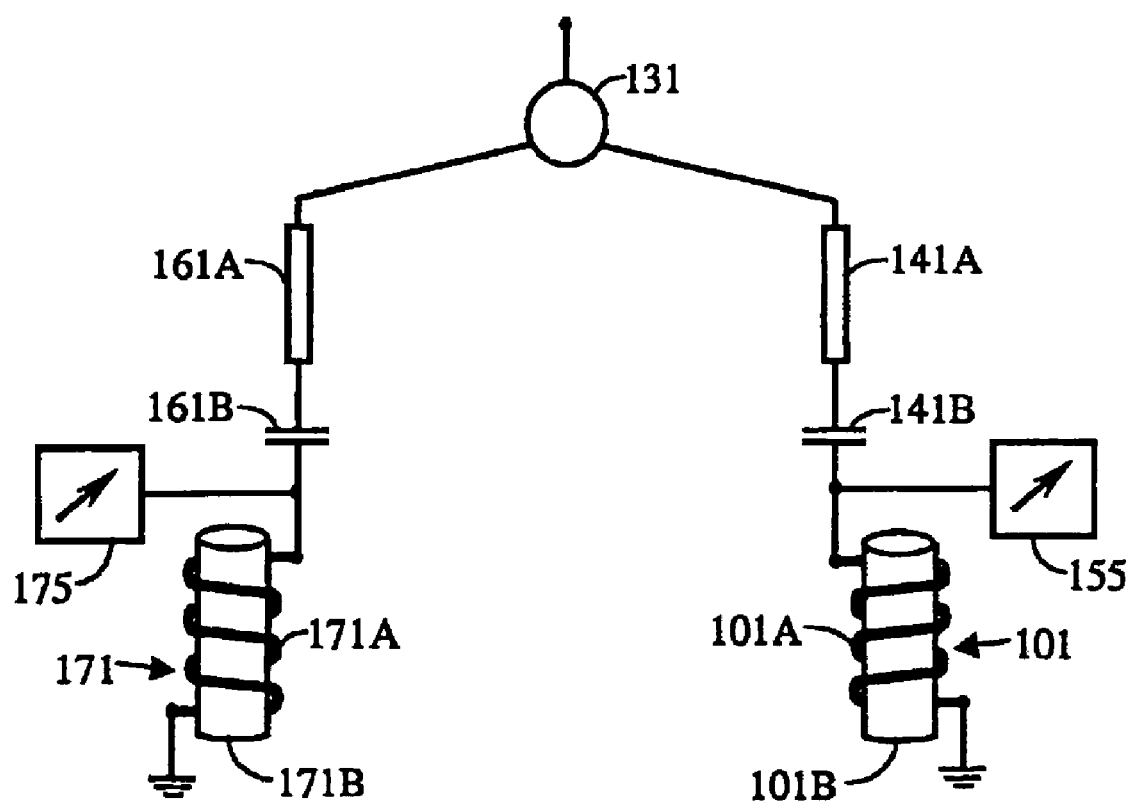
FIG. 11 illustrates an embodiment of a dc bias field adjustment circuit described as a component of the three-port isolator device.

A dc bias field adjustment circuit, as shown in FIG. 11, adjusts a dc magnetic field applied to the antenna element 101 for a coil-type antenna and a dc magnetic field applied to the impedance element 171. An impedance element 141A connected in series with a capacitor 141B comprise the impedance element 141. A variable dc-level current source 155 is connected between the capacitor 141B and the antenna element 101. In this case, the antenna element 101 includes a conductive wire 101A coiled around a ferrite core 101B. An impedance element 161A and a capacitor 161B comprise impedance element 161. A variable dc-level current source 175 is connected between the capacitor 161B and the impedance element 171. The impedance element 171 includes a conductive wire 171A wrapped around a ferrite core 171B.

For certain applications at relatively low signal frequencies (<100 MHz), the antenna structure 101 is often smaller than the radiated wavelength and may take the form of a coil of wire surrounding a ferrite core. This is common for the operation of an antenna as an electromagnet. An electrical signal flowing through the coil serves to reinforce the radiated electromagnetic radiation by virtue of multiple additions of the radiation pattern of single loops of current. Additionally, harmonic distortion terms are introduced to this electrical signal due to the non-linear response of ferrites that may be used as part of the antenna structure 101 or may be in close proximity to the antenna 101. Ferrite materials may also be used in three-port devices 131, 132, and 133 to provide a non-reciprocal effect for isolation, such as for a circulator. Once again, harmonic and intermodulation products will be introduced into the electrical signals in the circuit.

Figure 10:
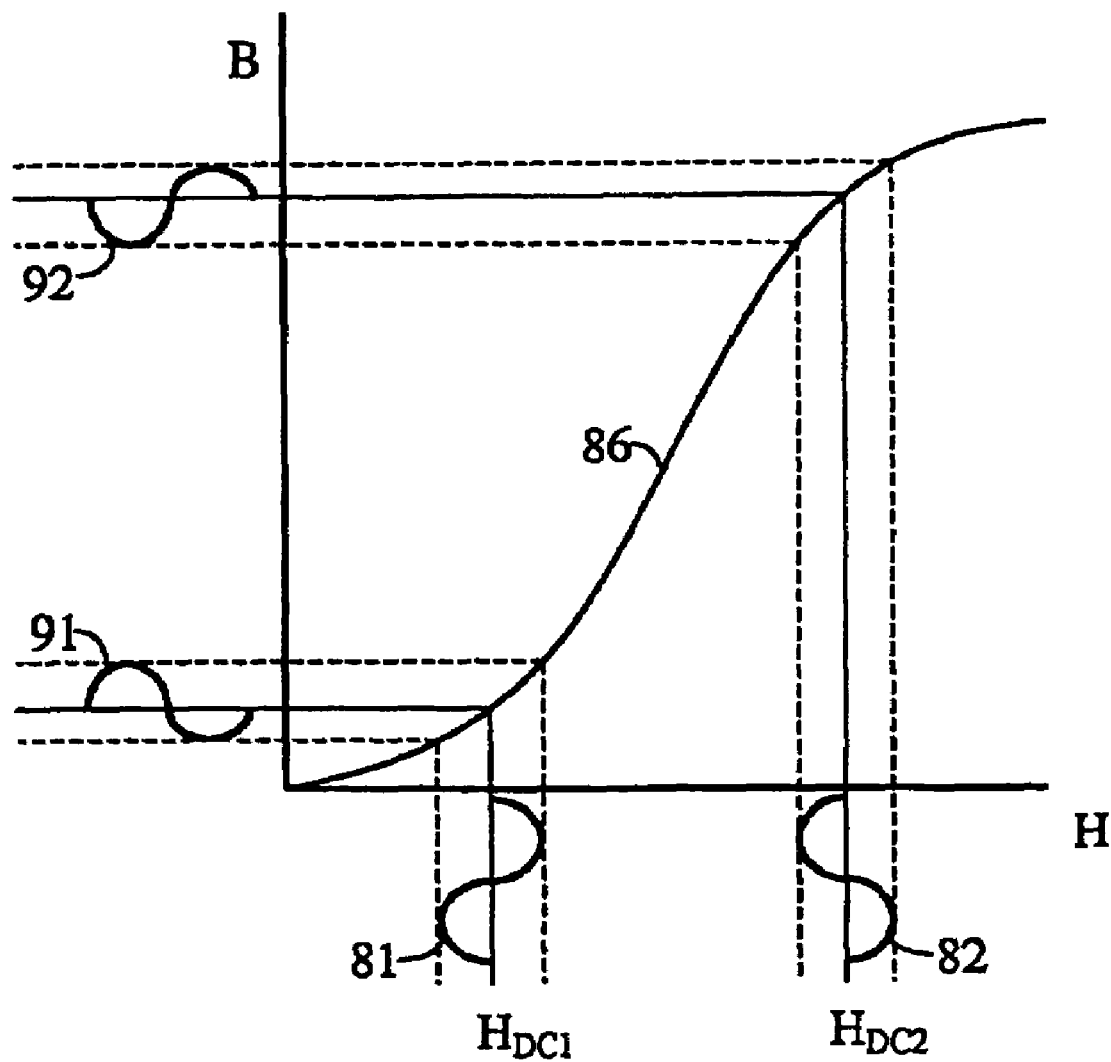
FIG. 10 is a plot of magnetic flux density of a ferrite material verses applied magnetic field strength.

The magnetic permeability of the ferrite material changes as the slope of the resulting magnetic flux density B versus the magnetic field H applied to the material. A B vs. H curve 86, along with the resulting distortion caused by the variation in magnetic permeability is shown in FIG. 10. Along the X-axis is a representation of two identical amplitude-modulated magnetic fields 81 and 82 as would be applied to the material, one field 81 having a relatively low bias field $H_{DC1}$ and the other field 82 having a high, near-saturation bias field $H_{DC2}$. A distorted magnetic flux density 91 and 92 resulting from each applied external magnetic field 81 and 82 is illustrated along the Y-axis. By adjusting the bias field $H_{DC1}$ or $H_{DC2}$ of either of the identical amplitude-modulated magnetic fields 81 and 82, it is possible to substantially reproduce the distortion pattern of the other magnetic flux profile 92 and 91 or create a complementary non-symmetric distortion pattern 92, as shown in FIG. 10, that will cancel if combined out-of-phase with the first pattern 91.

The non-linear behavior of B vs. H results from the restoring force of the magnetic dipoles in the ferrite material, which causes a damping effect on the alignment of the dipoles due to an external magnetic field. The total force on the dipoles is approximated by:

$$F(x)=kx+mx^2\lambda$$

This is a linear oscillator equation with an additional non-linear term proportional to the square of the displacement x. The differential equation of motion is:

$$x''+\omega_0^2 x-\lambda x^2=0$$

This equation is solved by using the method of perturbations in which the general solution is written as a power series in $\lambda$. Eliminating higher order terms yields the solution:

$$x(t) = A\cos\omega_0 t - \frac{\lambda A^2(\cos 2\omega_0 t - 3)}{6\omega_0^2}$$

which illustrates a second harmonic and a dc bias in addition to the harmonic oscillator solution. Higher powers of $\lambda$ introduce higher harmonics, and solutions yield intermodulation as well as higher harmonic terms if impressed signals are added to the equation of motion. Harmonic and intermodulation distortions are introduced into the signal current used to apply the magnetic field to the ferrite. Thus, appropriate adjustment of the bias magnetic field impinging on the ferrite may be used to adjust the degree of harmonic and intermodulation distortion in one part of the circuit in order to cancel distortion generated by the non-linear response of a ferrite in another part of the circuit.

The capacitors 141B and 161B provide a dc block so that dc bias currents produced by the dc-level current sources 155 and 175 remain in their associated circuit elements 101 and 171, respectively. The relative magnitude and direction of the bias currents generated by the dc-level current sources 155 and 175 are adjusted to provide the appropriate orientation and magnitude of the magnetic bias field such that the proportion of the harmonic distortion amplitude imparted to the electrical signal in the wire 171A compared to the amplitude of the non-distorted signal in the wire 171A is substantially equal to the proportion of the amplitude of the harmonic distortion imparted to the antenna element wire 101A compared to the amplitude of the non-distorted signal in the antenna element wire 101A. In this way, the signals sensed by the sensing elements 241 and 261 may be combined in the combining element 291 such that the contributions of harmonic distortion substantially cancel. Other types of de bias field adjustment circuits may be utilized. For example, an electromagnet (not shown) that is electrically separated from the impedance element 221 may be used to adjust magnetic bias fields, or such adjustment may be performed using permanent magnets (not shown) and position-adjustment devices (not shown). A dc bias field adjustment circuit such as the one shown in FIG. 10, may be used for adjusting dc magnetic fields. These fields can be applied to other elements that include ferrite materials such as elements 147, 153, 162, and 173.

The three-port devices 131, 132 and 133 shown in FIG. 9 may each comprise one or more ferrite circulators in order to improve isolation between their transmit and receive ports. A magnetic bias field is applied across a ferrite material to achieve the nonlinear response that effects the Faraday rotation of electromagnetic waves guided through the material. However, this nonlinearity causes harmonic and intermodulation distortion of the electromagnetic waves.

Figure 12:
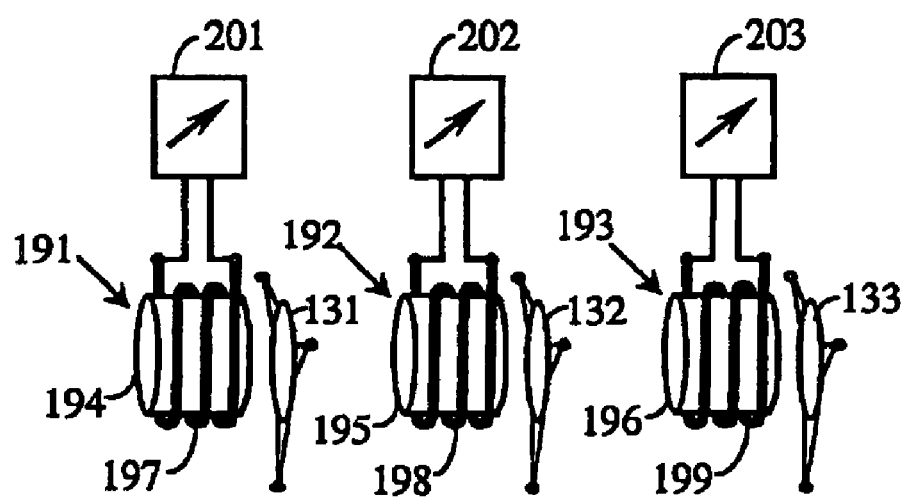
FIG. 12 shows three ferrite circulator three-port devices that are components of the three-port isolator device described in the embodiment of the present invention.

FIG. 12 shows the ferrite circulator three-port devices 131, 132, and 133. An electromagnet 191 with a conductive wire 197 coiled around a core 194 is connected to an adjustable dc electric current generator 201. The electromagnet 191 imparts a dc bias magnetic field to the ferrite circulator 131. An electromagnet 192 with a conductive wire 198 coiled around a core 195 is connected to an adjustable dc electric current generator 202. The electromagnet 192 imparts a dc bias magnetic field to the ferrite circulator 132. Likewise, an electromagnet 193 with a conductive wire 199 coiled around a core 196 is connected to an adjustable dc electric current generator 203. The electromagnet 193 imparts a dc bias magnetic field to the finite circulator 133. The distortion products imparted to the output signals $i_{S3}$ and $i_{S4}$ of sensing elements 221 and 222 may be canceled in the combining circuit 292 by adjusting the dc level of the magnetic field impinging upon either or both ferrite circulators 131 and 132. The sensing element 223 is responsive to the transmit current $i_{31T}$ flowing through the impedance element 123 and generates an electrical response signal $i_{S5}$. The responses $i_{S5}$ and $i_{S3}$ of the sensing elements 223 and 221 are adjusted in amplitude and phase and are combined in the combining circuit 294 for producing an output signal $i_{294}$ that is substantially free of the transmit components $i_{31T}$ and $i_{11T}$. The distortion products resulting from distortion of the transmit signals $i_{31T}$ and $i_{11T}$ in the response signals $i_{S3}$ and $i_{S5}$, respectively, may be canceled in the combining circuit 294 by the appropriate adjustment of the magnetic bias field of either or both of the ferrite circulators 131 and 133.

The sensing element 263 is responsive to the transmit current $i_{33T}$ flowing through the impedance element 163 for producing an electrical response signal $i_{S6}$. The responses $i_{S6}$ and $i_{S2}$ of the sensing elements 263 and 261 are adjusted in amplitude and phase and are combined in the combining circuit 293 for producing an output signal $i_{293}$ that is substantially free of the transmit components $i_{33T}$ and $i_{13T}$. Adjustment of the magnetic bias field of either or both of the ferrite circulators 131 and 133, as described above, may also be used to substantially cancel distortion terms in the output signal $i_{293}$ of the combining circuit 293. Finally, residual harmonic and intermodulation distortion persisting in the output signals $i_{293}$ and $i_{294}$ of the combining circuits 293 and 294 may be canceled in the combining circuit 295 most effectively if the harmonic distortion components in the signal outputs $i_{293}$ and $i_{294}$ are made to add together destructively, whereas the undistorted signals add constructively.

Figure 13:
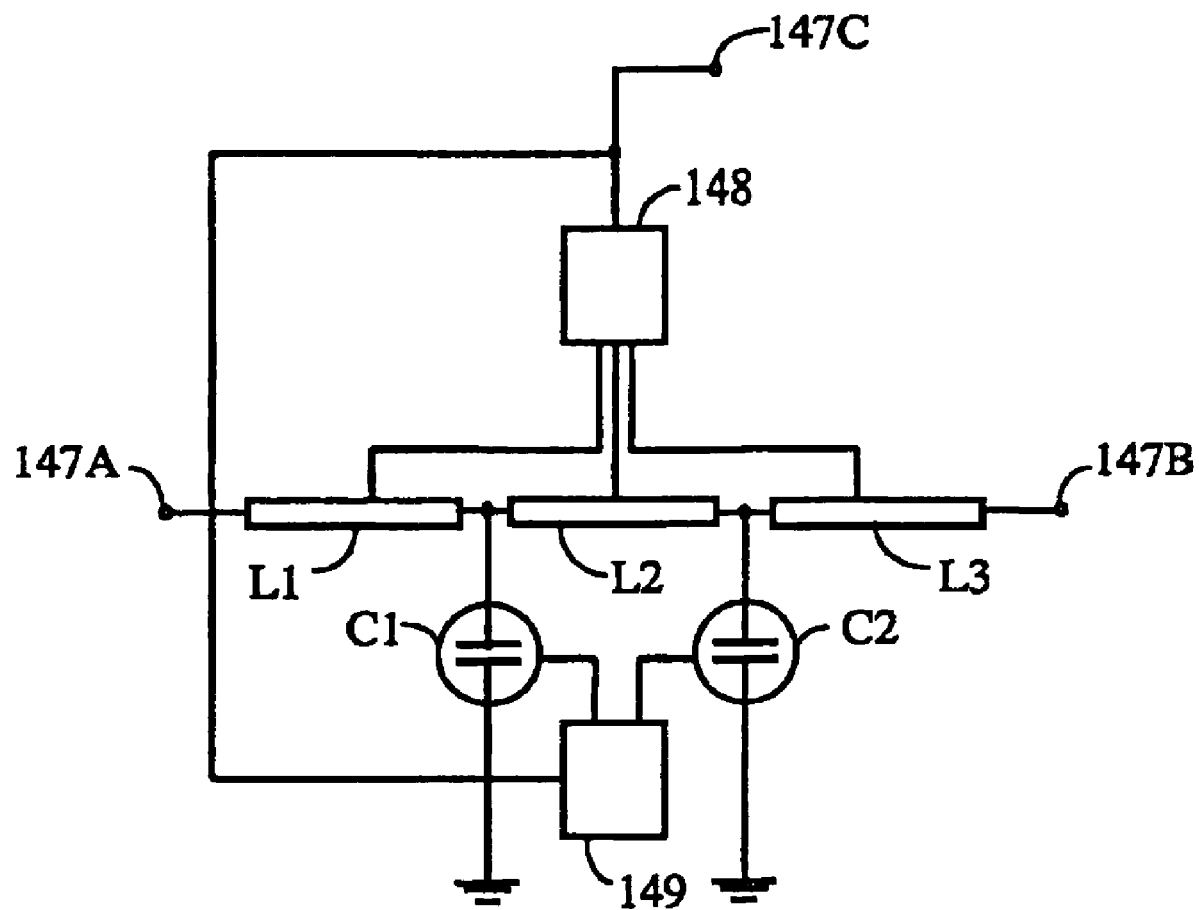
FIG. 13 is an embodiment of a distributed impedance element described as a component of the three-port isolator device and used for approximating a distributed impedance.

A circuit illustrating the components of one version of the variable distributed impedance element 147 is shown in FIG. 13. In this case, the element 147 includes an input terminal 147A, an output terminal 147B, and a control terminal 147C. A first adjustable inductor $L_1$, a second adjustable inductor $L_2$, and a third adjustable inductor $L_3$, are connected in series between the input and output terminals 147A and 147B, respectively. A first adjustable capacitor $C_1$ is connected to the junction of the first and second inductors, $L_1$ and $L_2$, and to electrical ground. A second adjustable capacitor $C_2$ is connected to the junction between the second and third inductors, $L_2$ and $L_3$, and to electrical ground. The impedance of each of the inductors $L_1$, $L_2$, and $L_3$ is controlled by an inductance control circuit 148 that processes the error signal $i_S$ received from the control terminal 147C. Either or both the amplitude and phase of the error signal $i_S$ provides information for how much the values of the inductors $L_1$, $L_2$, and $L_3$ need to be adjusted. Likewise, a capacitance control circuit 149 receives the error signal $i_S$ for adjusting the values of the capacitors C1 and C2.

The error signal $i_S$ represents the impedance-change of the antenna 101 relative to the impedance of the distributed impedance element 147. The error signal is magnitude increases as the impedance change of the antenna 101 causes the proportion of the transmit signals $i_{21T}$ to $i_{11T}$ to change. The error signal $i_S$ may be derived from a reference signal $V_{Ref}$ of a known amplitude and phase that is embedded in the transmitter 356 voltage $V_{SG}$. A comparison of either or both the amplitude and phase of the error signal is to the reference signal $V_{Ref}$ provides information about the degree of inductive and capacitive changes in the impedance-change of the antenna 101. Therefore, appropriate impedance-changes may be performed in the distributed impedance element 147 to minimize the error signal $i_S$. A predetermined algorithm may be used to dither the values of the inductors $L_1$, $L_2$, and $L_3$ and the capacitors, $C_1$ and $C_2$, and to utilize feedback-response in order to minimize the error signal $i_S$. The reference signal $V_{Ref}$ and hence the error signal $i_S$ are preferably outside the bandwidth of the transmit and receive signals. Transmit and receive signal components within the error signal is may be removed by filters (not shown) in the combining circuit 292 or in the inductance or capacitance control circuits 148 and 149.

The circuit shown in FIG. 13 is a three-stage approximation of a distributed impedance that has distributed inductance $L_d$ and capacitance $C_d$. In order to best approximate the distributed impedance, the values of $L_1$, $L_2$, and $L_3$ are substantially equal to $L_d/3$, and the values of $C_1$ and $C_2$, are substantially equal to $C_d/2$. For an n-stage approximation of a distributed impedance, where n is a positive integer greater than two, the values of each of the lumped inductors $L_1$ to $L_n$ and lumped capacitors $C_1$ to $C_{n-1}$ would be $L_d/n$ and $C_d/(n-1)$, respectively. Distributed resistance and conductance could also be approximated using lumped circuit elements in the method just described. A better approximation of distributed impedance is obtained by utilizing a larger number n of stages. To support this conclusion, one may examine the simplest approximation of a distributed impedance using an inductor L and capacitor C (not shown) whose values are $L_d$ and $C_d$, respectively. This circuit is suitable for single-frequency signals. For multiple-frequency or broadband signals, the values of the inductor L and capacitor C must be changed as signal frequency is changed in order to compensate for an apparent change in the distributed impedance components $L_d$ and $C_d$. The actual values of the distributed impedance components $L_d$ and $C_d$ do not change. Rather, the approximation of distributed impedance using only a single lumped inductor L and capacitor C breaks down for signals having broad band or multiple frequencies. Higher n-stage approximations of distributed impedance result in less variation in the apparent values of distributed inductance $L_d$ and capacitance $C_d$. The value of the impedance $Z_{dia3}$ of the three-stage circuit shown in FIG. 13 and the impedances $Z_{dia4}$ and $Z_{dia5}$ of four-stage and five-stage distributed impedance approximation circuits are as follows:

$$Z_{dia3} = \frac{(iL_d\omega/3)(-18+C_dL_d\omega^2)(-6+C_dL_d\omega^2)}{(36-18C_dL_d\omega^2+C_d^2L_d^2\omega^4)}$$

$$Z_{dia4} = \frac{(iL_d\omega/4)(-24+C_dL_d\omega^2)(288-48C_dL_d\omega^2+C_d^2L_d^2\omega^4)}{(-1728+864C_dL_d\omega^2+60C_d^2L_d^2\omega^4+C_d^3L_d^3\omega^6)}$$

$$Z_{dia5} = \frac{(iL_d\omega/5)(2000-100C_dL_d\omega^2+C_d^2L_d^2\omega^4)(400-60C_dL_d\omega^2+C_d^2L_d^2\omega^4)}{(-20+C_dL_d\omega^2)(-1728+3600C_dL_d\omega^2-120C_d^2L_d^2\omega^4+C_d^3L_d^3\omega^6)}$$

where $\omega$ is the signal frequency. Using arbitrary values for inductance $L_d$, capacitance $C_d$, and frequency $\omega$ ($L_d=1$, $C_d=100$, $\omega=1$), the difference in the impedance between a two-stage and a three-stage distributed impedance approximation circuit is approximately 0.0545, and the difference in impedance between a four-stage and five-stage circuit is approximately 0.000091. To reproduce distributed impedance exactly using n-stage circuits, n must be infinite. However, the accuracy of the approximation increases asymptotically as n increases.

The circuit shown in FIG. 13 may also be used in place of the distributed impedance that has distributed inductance $L_d$ and capacitance $C_d$. In order to best approximate the distributed impedance, the values of $L_1$, $L_2$, and $L_3$ are substantially equal to $L_d/3$, and the values of $C_1$ and $C_2$, are substantially equal to $C_d/2$. For an n-stage approximation of a distributed impedance, where n is a positive integer greater than two, the values of each of the lumped inductors $L_1$ to $L_n$ and lumped capacitors $C_1$ to $C_n$-1 would be $L_d/n$ and $C_d/(n-1)$, respectively. Distributed resistance and conductance could also be approximated using lumped circuit elements in the method just described. A better approximation of distributed impedance is obtained by utilizing a larger number n of stages. To support this conclusion, one may examine the simplest approximation of a distributed impedance using an inductor L and capacitor C (not shown) whose values are $L_d$ and $C_d$, respectively. This circuit is suitable for single-frequency signals. For multiple-frequency or broadband signals, the values of the inductor L and capacitor C must be changed as signal frequency is changed in order to compensate for an apparent change in the distributed impedance components $L_d$ and $C_d$. The actual values of the distributed impedance components $L_d$ and $C_d$ do not change. Rather, the approximation of distributed impedance using only a single lumped inductor L and capacitor C breaks-down for signals having broad band or multiple frequencies. Higher n-stage approximations of distributed impedance result in less variation in the apparent values of distributed inductance $L_d$ and capacitance $C_d$. The value of the impedance $Z_{dia3}$ of the three-stage circuit shown in FIG. 13 and the impedances $Z_{dia4}$ and $Z_{dia5}$ of four-stage and five-stage distributed impedance approximation circuits are as follows:

$$Z_{dia3} = \frac{(iL_d\omega/3)-18+C_cL_d\omega^2}{\left(36-18C_dL_d\omega^2+C_d^2L_d^2\omega^4\right)}$$

$$Z_{dia4} = \frac{(iL_d\omega/4)(-24+C_dL_d\omega^2)\left(288-48C_cL_d\omega^2+C_d^2L_d^2\omega^4\right)}{-1728+864C_dL_d\omega^2+60C_d^2L_d^2\omega^4+C_d^3L_d^3\omega^6}$$

$$Z_{dia5} = \frac{\left((iL_d\omega/5)\left(2000-100C_dL_d\omega^2+C_d^2L_d^2\omega^4\right)\right)\left(400-60C_dL_d\omega^2+C_d^2L_d^2\omega^4\right)}{\left((-20+C_dL_d\omega^2)\right)\left(\left(-1728+3600C_dL_d\omega^2-120C_d^2L_d^2\omega^4+C_d^3L_d^3\omega^6\right)\right)}$$

where $\omega$ is the signal frequency. Using arbitrary values for inductance $L_d$, capacitance $C_d$, and frequency $\omega$ ($L_d=1$, $C_d=100$, $\omega=1$), the difference in the impedance between a two-stage and a three-stage distributed impedance approximation circuit is approximately 0.0545, and the difference in impedance between a four-stage and five-stage circuit is approximately 0.000091. To reproduce distributed impedance exactly using n-stage circuits, n must be infinite. However, the accuracy of the approximation increases asymptotically as n increases.

The circuit shown in FIG. 13 may also be used in place of the distributed impedance element 153. It will be appreciated that the most accurate means to approximate a distributed impedance is to utilize another distributed impedance whose components are variable.

The compensation for changes in an antenna's distributed impedance may be extended to different types of antennas and different frequencies of operation. In the derivation of the radiation field of a center-fed dipole, Elliot shows that the transmission line feeding the antenna can be said to be delivering power to a radiative resistance placed across its terminus. The current distribution on the dipole is used to solve for the input impedance of the dipole antenna. This impedance is a function of the length of the dipole and the wavelength of the antenna signal.

The development of the field equations due to a center-fed dipole can be extended to the case of a monopole above a ground plane. Current elements above the ground plane will induce a current distribution in the plane that can be approximated by image current elements located a distance d below the plane in accordance with the location d of each of the actual current elements above the plane. The positions of the current elements relative to the ground plane figure into the radiation field equations for the antenna and, consequently, the radiative resistance of the antenna. Thus, as the relative location of nearby highly conductive electrically grounded objects changes, such as in a mobile cellular communications environment, the impedance of the antenna element will also change.

A set of transmission line equations are typically used to characterize wave propagation along a transmission line structure, such as an antenna, in terms of voltage and current instead of in terms of fields. The transmission line equations define inductance $L_d$, capacitance $C_d$, and conductance $Y_d$ (reciprocal of resistance) per unit length. The unit-length representation of these values implies distributed circuit quantities rather than lumped circuit elements. The general solutions to the transmission line equations lead to a representation of the characteristic impedance of the transmission line structure:

$$Z_0 = \sqrt{\left(\frac{i\omega L_d}{Y_d + i\omega C_d}\right)}$$

In the solution for a coaxial transmission line with the additional assumption of $Y_d=0$, Rao shows that the characteristic impedance of the line is:

$$Z_0 = \sqrt{\frac{L_d}{C_d}} = \frac{1}{2\pi}\sqrt{\frac{\mu}{\varepsilon}\ln(b/a)}$$

where a is the radius of the inner signal conductor and b is the radius of the outer ground conductor. This solution indicates that the characteristic impedance of the line, thus the characteristic impedance of an antenna, is affected by the relative position and geometry of the ground conductor to the signal conductor. The equation for the characteristic impedance also indicates that the ratio of permeability to permittivity could be changed in order to compensate for the change in $Z_0$ that would result from variations in the relative positions between the signal conductor and the ground conductor. To best approximate variations in the antenna impedance where $Y_d=0$ is not a valid assumption, it is preferable to utilize a variable distributed impedance element that has distributed conductance (preferably variable distributed conductance), inductance that is variable, and a value of capacitance that is variable.

As the antenna impedance $Z_2$ changes ($Z_2 \rightarrow Z_2 + \delta Z$), the voltage of the transmit signal at the output of the amplifier 105 changes to:

$$V'_{T11} = V_{T11} + \delta V_{T11} =$$
$$\frac{V_A((R_2 + Z_2 + \delta Z)(R_3 + Z_3) + R_1(R_2 + Z_2 + \delta Z + R_3 + Z_3))}{(R_2 + Z_2 + \delta Z)(R_3 + Z_3) +}$$

The values of the transmit currents $i_{T11}$, $i_{T12}$ and $i_{T13}$, being related to $V_{T11}$, change accordingly:

$$i'_{T11} = i_{T11} + di_{T11}$$

$$i'_{T12} = i_{T12} + di_{T12}$$

$$i'_{T13} = i_{T13} + di_{T13}$$

The values of the receiver currents are $i'_{R11}$, $i'_{R12}$, and $i'_{R13}$:

$$i'_{R12} = \frac{V'_{R12}}{Z_{in2}}$$

-continued $$i'_{R11} = i'_{R12}\frac{(R_3 + Z_3)}{(R_3 + Z_3 + R_1 + Z_1)}$$

$$i'_{R13} = i'_{R12}\frac{(R_1 + Z_1)}{(R_3 + Z_3 + R_1 + Z_1)}$$

where $$V'_{R12} = \frac{(V_{R12}/(Z_2 + dZ))}{(1/(Z_2 + dZ) + 1/Z_{in2})}$$

A three-branch circuit shown in FIG. 9 is comprised of the transmit branch, the first reference branch, the three-port device 131 (which in this case is a simple linear junction such as a resistive divider and thus defines the circuit as a simple three-branch circuit) and a transmit signal output branch that includes impedance element 121. Applicant has determined that in each branch of the simple three-branch circuit, the ratio of the change in the transmit current $\delta i_{T11}$, $\delta i_{T12}$, and $\delta i_{T13}$, to the receive current $i'_{R11}$, $i'_{R12}$, and $i'_{R13}$ is substantially equal:

$$\frac{di_{T11}}{i'_{R11}} = \frac{di_{T12}}{i'_{R12}} = \frac{di_{T13}}{i'_{R13}}$$

Furthermore, applicant has determined experimentally that this relation holds for the case of non-linear three-port networks. Thus, any attempt to compensate for the change in transmit current in one branch by canceling it with the change in transmit current in one of the other branches results in cancellation of the receive signal. However, if the impedance of one of the branches besides the transmit branch is made to change in response to a change in the impedance of the antenna element 101 and that change is a known relation to the change $\delta Z$ in the antenna impedance 151, then the change in the transmit current in one branch of a three-branch circuit may be used to cancel the change in transmit current in one of the other branches without canceling all of the receive signal.

The reference signal $V_{Ref}$ embedded in signal $V_{SG}$ appears as a reference transmit component $i_{RT11}$ embedded in the transmit signal $i_{T11}$ generated by the first amplifier 105. Therefore, the other transmit currents $i_{T21}$ and $i_{T31}$ will each include a reference transmit component $i_{RT21}$ and $i_{RT31}$, respectively. Thus, the signal $i_{S3}$ has a component reference transmit signal $i_{RS3}$ that is proportional to the transmit component $i_{RT11}$. In addition, the signal $i_{S2}$ has a component reference transmit signal $i_{RS2}$ that is proportional to a transmit component $i_{RT13}$ that flows through impedance element 161. The electrical signal $i_{PU1}$ is input to the impedance controller 181, which may include one or more signal filters (not shown). The signal filter(s) removes components that are not used for providing a measure of the change in antenna impedance. The impedance controller 181 adjusts the impedance of impedance element 171 by a predetermined amount dR that is proportional to the change in the amplitude and or phase of the reference transmit signal $i_{RS}3$, thus reflecting a change in at least one of the real and imaginary parts of the antennaOs 101 impedance. The ideal change $i\delta_{RS3}$ in the reference transmit signal $i_{RS3}$ due to an impedance change $\delta Z$ in the antenna impedance 151 is shown as follows:

$i_{ARS3} = -((\delta Z V_A(R_3+Z_3)^2)/((R_1R_2+R_1R_3+R^2R_3+R_2Z_1+R_3Z_1+R_1Z_2+R_3Z_2+Z_1Z_2+R_1Z_3+R_2Z_3+Z_1Z_3+Z_2Z_3)$
$(\delta ZR_1+R_{1R2}+\delta ZR_3+R_1R_3+R_2R_3+\delta ZZ_1+R2Z1+R3Z1+R1Z2+R3Z2+Z1Z2+\delta ZZ3+R1Z3+R2Z3+Z1Z3+Z2Z3)))$ For small impedance changes $\delta Z$, the signal-change $i\delta_{RS3}$ is substantially proportional to $\delta Z$. Signal change $i\delta_{RS3}$ establishes boundary conditions on how large $\delta R$ can be. This is affected by changes $\delta R$ in the impedance of impedance element 171. The actual signal-change $i\delta_{RS3}$ is shown in the following equation:

$$i_{ARS3} = -((V_A(2\delta R\delta ZR_2 + 2\delta RR_2^2 + 2\delta R\delta ZR_3 + \delta ZR_3^2 + 2\delta R\delta ZZ_2 + 4\delta RR_2Z_2 + 2\delta RZ_2^2 + 2\delta R\delta ZZ_3 + 2\delta ZR_3Z_3 + \delta ZZ_3^2))/((R_1R_2 + R_1R_3 + R_2R_3 + R_2Z_1 + R_3Z_1 + R_1Z_2 + R_3Z_2 + Z_1Z_2 + R_1Z_3 + R_2Z_3 + Z_1Z_3 + Z_2Z_3)$$
$$(2\delta R\delta Z + 2\delta RR_1\delta ZR_1 + 2\delta RR_2 + R_1R_2 + \delta ZR_3 + R_1R_3 + R_2R_3 + 2\delta RZ_1 + \delta ZZ_1 + R_2Z_1 + R_3Z_1 + 2\delta RZ_2 + R_1Z_2 + R_3Z_2 + Z_1Z_2 + \delta ZZ_3 + R_1Z_3 + R_2Z_3 + Z_1Z_3 + Z_2Z_3)))$$

It is important that the impedance-change $\delta R$ of element 171 has a smaller effect on the signal $i_{S3}$ than the impedance-change $\delta Z$ of the antenna 101. This is to avoid a positive feedback condition where the change in impedance of the impedance element 171 causes the controller 181 to create an even larger impedance change in the impedance element 171. In this case, the impedance change $\delta R$ is set proportional to impedance change $\delta Z$ by a scaling factor b whose value is determined by this boundary condition.

The electrical signal $i_{S5}$ includes a reference transmit signal $i_{RS5}$ that is used to measure the impedance-change of the impedance element 153 and is interpreted by the impedance controller 183 for adjusting the variable impedance element 173 by a predetermined amount. The ratio of the impedance-change of element 173 to the impedance-change of the element 153 is proportional to the ratio of the impedance-change of element 171 to change in impedance of the antenna 101. The output signal $i_{294}$ of the combining circuit 294 includes a receive component $i_{R3}$ and a transmit component $i_{T3}$ that is proportional to $i\delta_{RS3}$.

The output signal $i_{293}$ of the combining circuit 293 includes a receive component $i_{R2}$ and a transmit component $i_{T2}$ proportional to a change in the reference transmit component signal $i_{RT13}$ at element 161, $i\delta_{RS2}$, given by the following equation:

$$i_{ARS3} = ((g^v_{ref}\delta Z(-2b\delta ZR_2 - 2bR_1R_2 - 2bR_2^2 - R_1R_3 - 2bR_2Z_1 + R_3Z_1 - 2b\delta ZZ_2 - 2bR_1Z_2 - 4bR_2Z_2 - 2bZ_1Z_2 - 2bZ_2^2 + R_1R_3 + Z_1Z_3))/((R_1R_2 + R_1R_3 + R_2R_3 + R_2Z_1R_3Z_1 + R_1Z_2 + R_3Z_2 + Z_1Z_2 + R_1Z_3 + R_2Z_3 + Z_1Z_3 + Z_2Z_3)(2b\delta Z^2 + \delta ZR_1 + 2b\delta R_1 + 2b\delta ZR_2 + R_1 + R_2 + \delta ZR_3R_1R_3 + R_2R_3 + \delta ZZ_1 + 2b\delta ZZ_1 + R_2Z_1 + R_3Z_1 + 2b\delta ZZ_2 + R_1Z_2 + R_3Z_2 + Z_1Z_2 + \delta ZZ_3 + R_1R_3 + R_2Z_3Z_1Z_3 + Z_2Z_3)))$$

The output signals $i_{293}$ and $i_{294}$ include non-zero transmit components $i_{T3}$ and $i_{T2}$, particularly when the antenna impedance 151 is not proportional to the impedance of element 153. This can occur due to a time-lag in the compensation of the impedance of element 153 to impedance-changes of the antenna impedance 151. The output signals $i_{293}$ and $i_{294}$ are combined in the combining circuit 295 such that the transmit components $i\delta_{RS}3$ and $i\delta_{RS}2$ cancel. In this case, a constant gain G having the value:

$$G = \frac{2b(R_2 + Z_2)^2 + (R_3 + Z_3)2}{-2b(R_2 + Z_2)(R_2 + R_1 + Z_2 + Z_1) + (R_1 + Z_1)(R_3 + Z_3)}$$

applied to the output signal $i_{294}$ will result in substantial cancellation of the transmit components $i\delta_{S3}$ and $i\delta_{S2}$ from the output of the combining circuit 295 while preserving some of the receive signal components $i_{R3}$ and $i_{R2}$.

In the preferred experimental circuit (FIG. 9), the cancellation of many varieties of direct transmit-signal interference has been demonstrated in order to provide a basic understanding of the types of direct transmit-signal interference that exist and the methods needed to cancel this interference. With respect to this understanding, many aspects of this invention may vary, such as in accordance with signal-frequency of operation. For example, the concepts explained with respect to the three-port isolator design shown in FIG. 9 also apply to an electromagnetic pickup/driver assembly that could be used to both sense the motion of a ferromagnetic object and impart a force upon that object simultaneously. In this regard, it should be understood that such variations will fall within the scope of the present invention, its essence lying more fundamentally with the design realizations and discoveries achieved than merely the particular designs developed.

The foregoing discussion and the claims which follow describe the preferred embodiments of the present invention. Particularly with respect to the claims, it should be understood that changes may be made without departing from its essence. In this regard, it is intended that such changes would still fall within the scope of the present invention. It simply is not practical to describe and claim all possible revisions to the present invention which may be accomplished. To the extent such revisions utilize the essence of the present invention, each naturally fall within the breadth of protection encompassed by this patent. This is particularly true for the present invention since its basic concepts and understandings are fundamental in nature and can be broadly applied.

I claim:

1. A receiver comprising:
    a receive processing block to be coupled to a plurality of spatially separated antennas, the receive processing block comprising:
        a delay block for each signal received by an antenna, wherein the delay of a particular delay block is determined according to a geometric position of the antenna, to obtain a delayed signal corresponding to each signal;
        a plurality of weighting components to apply weights to the delayed signals to produce delayed weighted signals; and
        a plurality of combining elements to combine various ones of the delayed weighted signals to obtain combined signals, wherein at least one combined signal is to be used for further receive processing.

2. The receiver according to claim 1, wherein at least one of said weights is determined according to a spatial gain distribution ratio of signals received by antennas.

3. The receiver according to claim 1, wherein at least some of said delays and weights are chosen to maximize reception in a particular direction associated with a particular signal received by an antenna.

4. The receiver according to claim 3, wherein at least some of said delays and weights are chosen to attenuate a signal received in at least one direction other that said particular direction.

5. The receiver according to claim 1, wherein said plurality of combining elements comprises at least two layers of combining elements, a first layer of which is to combine delayed weighted signals, and a second layer of which is to combine combined delayed weighted signals from said first layer.

6. The receiver according to claim 1, wherein at least one of said plurality of combining elements comprises at least one weighting element.

7. A transmitter comprising:
    a transmit signal processing block to be coupled to a plurality of spatially separated antennas, the transmit signal processing block comprising:

a signal transmitting element to generate a transmit signal for transmission over the antennas;

a frequency-control element to be coupled to the signal transmitting element to adjust a carrier frequency of the transmit signal to produce a frequency-controlled signal; and a weighting processor corresponding to each antenna, an output of the respective weighting processor to be coupled to the respective antenna, each weighting processor to be coupled to receive the frequency-controlled signal, each weighting processor comprising:

at least two weighting components to apply weights to copies of the frequency-controlled signal; and at least one combining element to combine weighted copies of the frequency-controlled signal;

wherein the frequency-control element is further to adjust the values of the weights; and wherein the weights are determined according to geometric positions of the antennas.

8. The transmitter according to claim 7, wherein said weights are chosen to adjust a directionality of a transmit signal to be transmitted over the antennas.

9. The transmitter according to claim 8, wherein said weights are chosen to attenuate signal transmission in at least one direction.

10. A transceiver comprising:

a receive processing block to be coupled to a plurality of spatially separated antennas, the receive processing block comprising:

a delay block for each signal received by an antenna, wherein the delay of a particular delay block is determined according to a geometric position of the antenna, to obtain a delayed signal corresponding to each signal;

a plurality of weighting components to apply first weights to the delayed signals to produce delayed weighted signals; and a plurality of combining elements to combine various ones of the delayed weighted signals, wherein at least one combined signal is to be used for further receive processing; and a transmit signal processing block to be coupled to the plurality of spatially separated antennas, the transmit signal processing block comprising:

a signal transmitting element to generate a transmit signal for transmission over the antennas;

a frequency-control element to be coupled to the signal transmitting element to adjust a carrier frequency of the transmit signal to produce a frequency-controlled signal; and a weighting processor corresponding to each antenna, an output of the respective weighting processor to be coupled to the respective antenna, each weighting processor to be coupled to receive the frequency-controlled signal, each weighting processor comprising:

at least two weighting components to apply second weights to copies of the frequency-controlled signal; and at least one combining element to combine weighted copies of the frequency-controlled signal;

wherein the frequency-control element is further to adjust the values of the second weights; and wherein the second weights are determined according to geometric positions of the antennas.

11. The transceiver according to claim 10, wherein at least one of said first weights is determined according to a spatial gain distribution ratio of signals received by antennas.

12. The transceiver according to claim 10, wherein at least some of said delays and first weights are chosen to maximize reception in a particular direction associated with a particular signal received by an antenna.

13. The transceiver according to claim 12, wherein at least some of said delays and first weights are chosen to attenuate a signal received in at least one direction other that said particular direction.

14. The transceiver according to claim 10, wherein said plurality of combining elements comprises at least two layers of combining elements, a first layer of which is to combine delayed weighted signals, and a second layer of which is to combine combined delayed weighted signals from said first layer.

15. The transceiver according to claim 10, wherein at least one of said plurality of combining elements comprises at least one weighting element.

16. The transceiver according to claim 10, wherein said second weights are chosen to adjust a directionality of a transmit signal to be transmitted over the antennas.

17. The transceiver according to claim 10, wherein said second weights are chosen to attenuate signal transmission in at least one direction.

* * * * *

UNITED STATES PATENT AND TRADEMARK OFFICE
CERTIFICATE OF CORRECTION

PATENT NO.        : 7,477,921 B2                                             Page 1 of 1
APPLICATION NO.   : 11/872240
DATED             : January 13, 2009
INVENTOR(S)       : Steve Shattil It is certified that error appears in the above-identified patent and that said Letters Patent is hereby corrected as shown below:

Claim 4, line 3, please amend "other that" to read --other than--.

Claim 13, line 3, please amend "other that" to read --other than--.

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,477,921 B2                                              Page 1 of 1
APPLICATION NO.   : 11/872240
DATED             : January 13, 2009
INVENTOR(S)       : Steve Shattil It is certified that error appears in the above-identified patent and that said Letters Patent is hereby corrected as shown below:

Column 26, Claim 4, line 54, please amend "other that" to read --other than--.

Column 28, Claim 13, line 29, please amend "other that" to read --other than--.

This certificate supersedes the Certificate of Correction issued April 21, 2009.

Signed and Sealed this

Twelfth Day of May, 2009

JOHN DOLL
*Acting Director of the United States Patent and Trademark Office*